United States Patent [19]
Yokoyama et al.

[11] Patent Number: 6,094,293
[45] Date of Patent: Jul. 25, 2000

[54] OPTICAL SWITCHING APPARATUS FOR USE IN AN OPTICAL COMMUNICATION SYSTEM

[75] Inventors: Yoshinori Yokoyama; Munehisa Takeda; Hitoshi Ota; Aritomo Uemura; Tadayoshi Kitayama, all of Tokyo, Japan

[73] Assignee: Mitsubishi Denki Kabushiki Kaisha, Tokyo, Japan

[21] Appl. No.: 09/358,807

[22] Filed: Jul. 22, 1999

[30] Foreign Application Priority Data

| Jul. 23, 1998 | [JP] | Japan | 10-207929 |
| Jul. 23, 1998 | [JP] | Japan | 10-207935 |
| May 13, 1999 | [JP] | Japan | 11-132552 |

[51] Int. Cl.[7] .................................................. G02F 1/09
[52] U.S. Cl. ...................... 359/280; 359/298; 359/318; 359/320; 359/324; 385/31; 385/42; 385/47
[58] Field of Search ............................ 359/224, 280, 359/291, 298, 318, 320, 850, 324; 385/31, 33, 42, 43, 47

[56] References Cited

U.S. PATENT DOCUMENTS

| 3,716,804 | 2/1973 | Groschwitz | 359/320 |
| 4,789,228 | 12/1988 | Le Pesant et al. | 359/318 |
| 4,844,577 | 7/1989 | Ninnis et al. | 359/320 |
| 5,835,257 | 11/1998 | Itoh et al. | 359/324 |
| 5,982,521 | 11/1999 | Bessho et al. | 359/224 |
| 5,999,305 | 12/1999 | Fukushima | 385/280 |
| 6,009,219 | 12/1999 | Doyle | 385/31 |
| 6,018,411 | 1/2000 | Fukushima et al. | 359/280 |
| 6,031,952 | 2/2000 | Lee | 385/47 |

OTHER PUBLICATIONS

Mohr, "MOEMS Fabricated By The LIGA Technique—An Overview", MOEMS 97 Technical Digest, Nov. 1997, pp. 221–259.

*Primary Examiner*—Loha Ben
*Attorney, Agent, or Firm*—Leydig, Voit & Mayer

[57] ABSTRACT

An optical switch includes a light emitter for emitting light and light receivers. A reflector is used for changing a path of light emitted from the light emitter. The reflector is held by a permanent magnet having first and second magnetic poles of opposite polarities. A supporting member is provided for the reflector and the first permanent magnet so that the reflector and the first permanent magnet can move between a first position and a second position. In the first position, the reflector and the first permanent magnet interact so the emitted light travels into one light receiver of the light receivers. On the other hand, in the second position, the reflector and the first permanent magnet interact so the emitted light travels into another of the light receivers. The switch further includes an electromagnet for generating first and second magnetic fields selectively for moving the reflector and the first permanent magnet between the first and second positions.

17 Claims, 37 Drawing Sheets

2 : OPTICAL SWITCH
4 : SUPPORTING MEMBER
16 : PERMANENT MAGNET
18 : MIRROR
20 : ELECTROMAGNETIC DEVICE

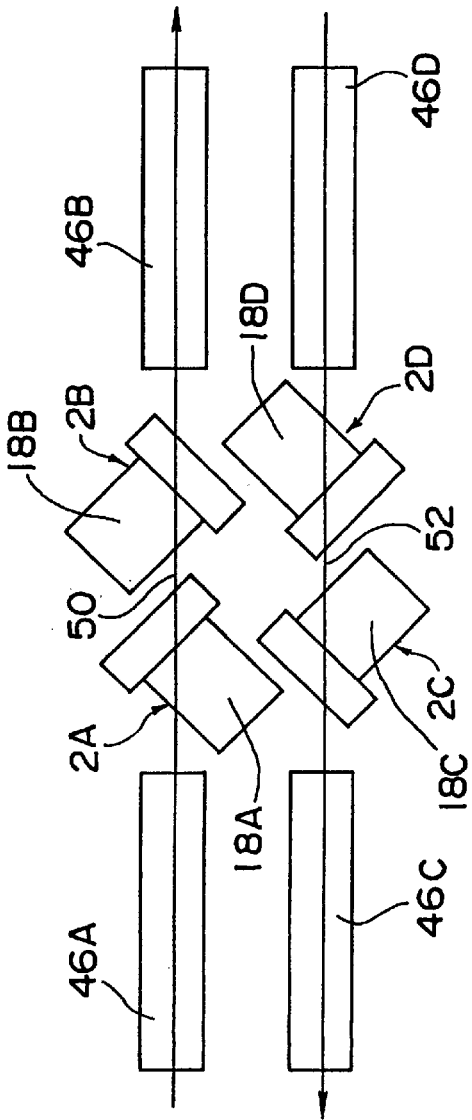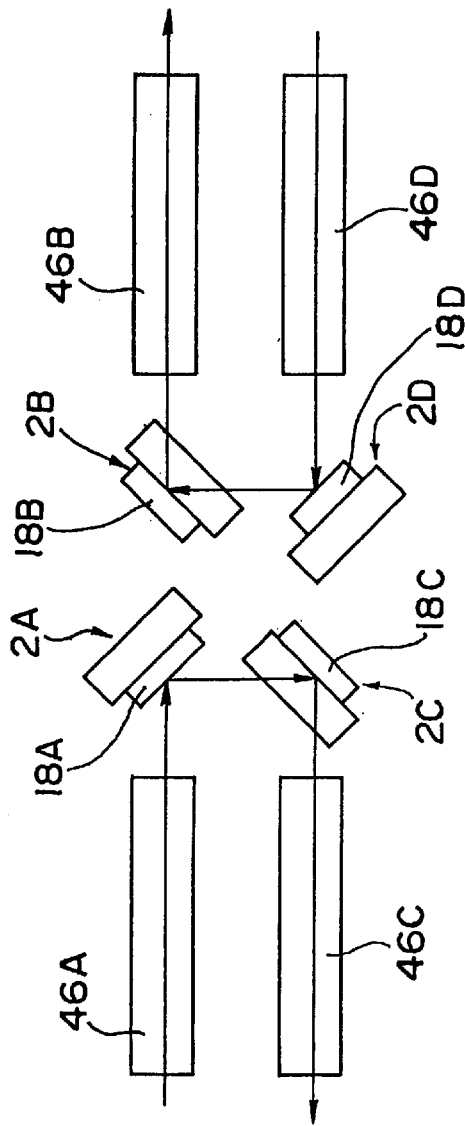
Fig.3A
Fig.3B

Fig.24

| Fibers | I/O PATTERN | | | | | |
|---|---|---|---|---|---|---|
| | 1 | 2 | 3 | 4 | 5 | 6 |
| 306A | I | I | I | O | O | O |
| 306B | O | I | O | I | O | I |
| 306C | I | O | O | O | I | I |
| 306D | O | O | I | I | I | O |

Fig.25A1
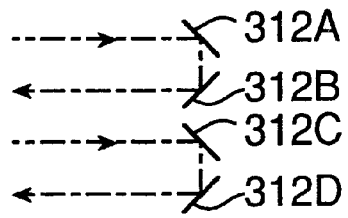
Fig.25A2
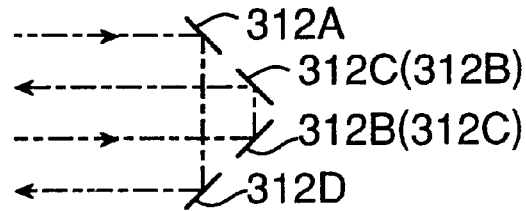
Fig.25B1
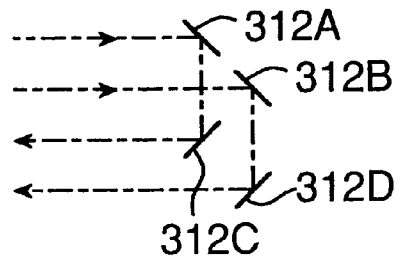
Fig.25B2
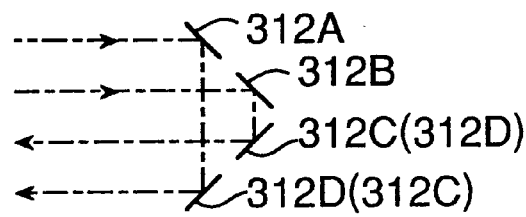
Fig.25B2'
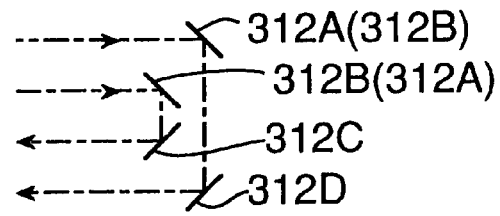
Fig.25C1
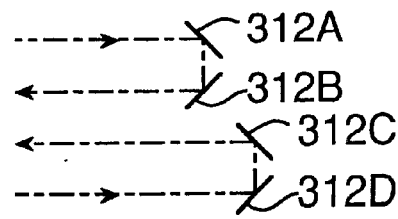
Fig.25C2
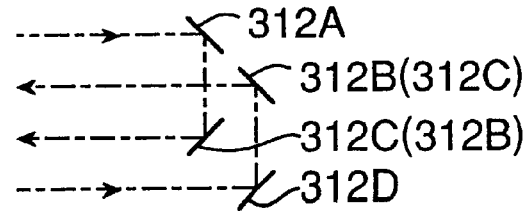

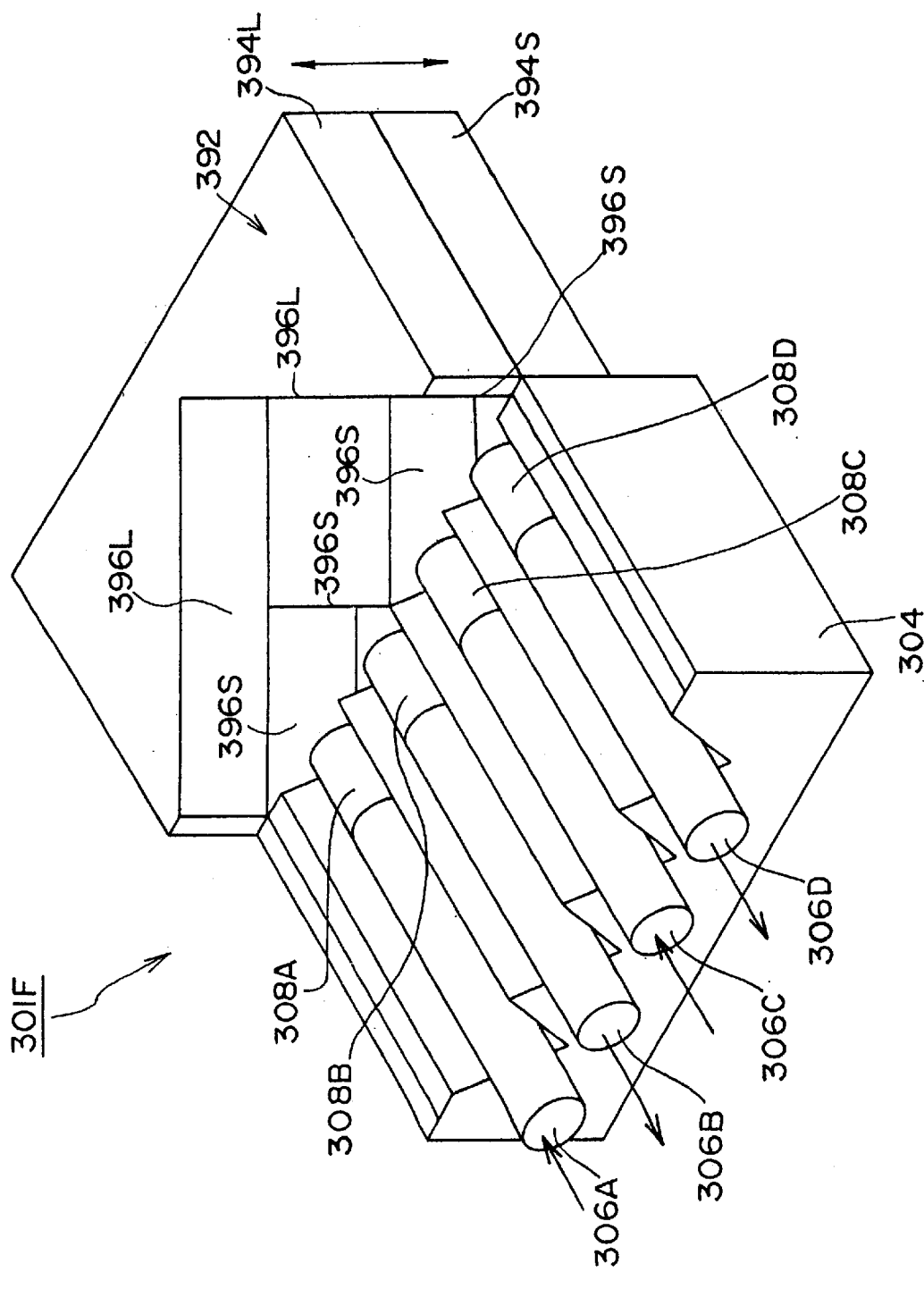

6,094,293

OPTICAL SWITCHING APPARATUS FOR USE IN AN OPTICAL COMMUNICATION SYSTEM

FIELD OF THE INVENTION

The present invention relates to an optical switching apparatus for use in an optical communication system. More particularly, the present invention relates to an optical switching apparatus for changing an optical light path by moving an optical-path switching member such as mirror.

BACKGROUND OF THE INVENTION

A recent drastic development in an information network or multimedia processing demands an optical communication system capable of transmitting a great amount of data. A typical optical communication system requires a number of small-sized, high-speed, and highly reliable optical switches for a line switching operation in an emergency and also for a private branch exchange system, which has resulted in an increased development of such optical switching devices.

FIG. 20 shows a perspective view of a conventional optical switching device, disclosed in the International Conference on Optical MEMS (Micro Electro Mechanical Systems) and Their Applications. The optical switching apparatus includes four optical fibers 201, 202, 203, and 204. Also provided in the apparatus are a movable mirror 205 coated with a conductive material for routing light, a wire 206 for supporting and biasing the mirror 205 so that it takes a horizontal position, an insulating layer 207, and a pair of electrodes 208.

With the optical switching device shown in FIG. 20, when the mirror 205 is located in the vertical position by an electrostatic force generated by the application of a voltage to the electrodes 208, light emitted from the optical fiber 201 is reflected by the mirror 205 into the optical fiber 204. Light emitted from the optical fiber 202 is also reflected by the mirror 205, where it is oriented into the optical fiber 203. When the electrostatic force is turned off and thereby the mirror 205 returns to the horizontal position, light emitted from the optical fiber 201 directly enters the optical fiber 203. Light emitted from the optical fiber 202 also directly enters the optical fiber 204.

FIG. 42 shows, in perspective view, another prior art optical switching device, generally indicated by reference numeral 700. The device 700 has a housing 702. The housing has side walls 704A, 704C, 704D and 704F supporting optical fibers 706A, 706C, 706D and 706F, respectively. Provided at the center of the housing 702 is the mirror 708, which is moved between two positions, indicated by solid and dashed lines, by an electrostatic linear motor (not shown).

With the optical switching device, when the movable mirror 708 takes the solid-line position, light emitted from the optical fiber 706A is reflected by the movable mirror 708 and then directed toward the optical fiber 706F. Also, light emitted from the optical fiber 706C is reflected by the movable mirror 708 and then directed toward the optical fiber 706D. When the movable mirror 708 is, on the other hand, in the dashed line position, light emitted from the optical fiber 706A is transmitted into the opposing optical fiber 706D. Also, light emitted from the optical fiber 706C is guided into the opposing optical fiber 706F.

With the first prior art optical switching device, a wire is used for supporting the light-routing mirror, and electrostatic force for driving the mirror. However, the wire is fixed at both its ends by a supporting member, which requires torque to rotate the wire about its axis so that it might be difficult to move the mirror to the desired position, and power should always be supplied to hold the mirror in the vertical position.

Also, in the second prior art switching device 700, optical fibers 706A, 706C, 706D and 706F extend out of the housing 702 in four directions, which requires a larger space for mounting. In addition, the electrostatic linear motor used for driving the movable mirror 708 should always be supplied with power for maintaining the solid-line position.

Furthermore, neither of the optical switching devices has a mechanism for detecting the position of the mirror, which prevents checking whether the device functions correctly. This in turn results in a system having the switching device that can not self-detect a malfunction, which decreases reliability. In addition, light emitted from one optical fiber is designed to be directly received by the associated optical fiber, rather than being concentrated by an optical element such as lens. This results in a significant part of the light from the one optical fiber failing to be transmitted into the associated optical fiber due to a possible offset of the optical fibers. Furthermore, the optical fiber is shaped at its end opposing the associated optical fiber to form an end surface perpendicular to a longitudinal axis of the one optical fiber, which reflects and returns a major part of the light at the end surface.

SUMMARY OF THE INVENTION

An object of the present invention is therefore to provide an optical switching apparatus and an optical switch for use in the optical switching apparatus, in which an electromagnetic force is used for driving a mirror, and the mirror can positively be retained in positions without any electric power. The optical switching apparatus can detect states of the optical switch by detecting positions of the mirror. Further, by a suitable combination of an optical fiber and a lens, optical losses at the end of optical paths and an amount of light reflected back into the optical path can be reduced.

A second object of the present invention is to provide an optical switching apparatus, which reduces a mounting area thereof. With the switching apparatus, the mirror can positively be retained without any electric power.

To achieve these objects, an optical switch of the present invention for transmitting light from a light emitter to a selected one of plural light receivers includes a reflector for changing a path of light emitted from a light emitter and a first permanent magnet for holding the reflector, the first permanent magnet having first and second magnetic poles having opposite polarities. A supporting member is provided for supporting the reflector and the first permanent magnet so that the reflector and the first permanent magnet can move between a first position and second positions. In the first position, the reflector and the first permanent magnet cause the emitted light to travel into one light receiver of the plural light receivers. In the second position, on the other hand, the reflector and the first permanent magnet cause the emitted light to travel into another light receiver of the plural light receivers. The switch further includes magnetic means for generating first and second magnetic fields selectively, causing the reflector and the first permanent magnet to move between the first and second positions.

In another aspect of the optical switch according to the present invention, the switch further includes holding means for holding the reflector in the first and second positions.

In another aspect of the optical switch according to the present invention, the holding means further includes a second permanent magnet mounted on the reflector, a first electromagnet positioned adjacent to the reflector in the first position, the first electromagnet having a first iron core, a second electromagnet positioned adjacent to the reflector in the second position, the second electromagnet having a second iron core, and a control circuit for controlling the first and second electromagnets. With the arrangement, when the reflector is in the first position, the control circuit energizes the first electromagnet for a certain period of time to cause an attraction force between the first iron core and the second permanent magnet and thereby hold the reflector in the first position. On the other hand, when the reflector is in the second position, the control circuit energizes the second electromagnet for a certain period of time to cause an attraction force between the second iron core and the second permanent magnet and thereby hold the reflector in the second position.

In another aspect of the optical switch according to the present invention, the switch further includes a detector for detecting the reflector in the first or second position.

In another aspect of the optical switch according to the present invention, the detector includes an electrically conductive member mounted on the reflector, and first and second terminals. The first and second terminals are positioned so that the first and second terminals are electrically separated from each other and make contact with the conductive member of the reflector in the first or second position. Also, the detector includes a detecting circuit for detecting whether the first and second terminals are electrically connected through the conductive member.

In another aspect of the optical switch according to the present invention, the detector includes an electrically conductive member mounted on the reflector and first and second electrodes. The first and second electrodes are positioned so that the first and second electrodes are electrically separated from each other and adjacent to the conductive member of the reflector in the first or second position. Also, the detector includes a detecting circuit for detecting a variation of capacitance between the first and second electrodes.

In another aspect of the optical switch according to the present invention, the detector includes a photo-coupler positioned adjacent to the reflector in the first or second position and a detecting circuit for detecting an output signal transmitted from the photo coupler.

In another aspect of the optical switch according to the present invention, the light emitter and at least one of the first and second light receivers each have an optical fiber, a lens arranged on a longitudinal axis of the optical fiber, and a holder for holding the optical fiber and the lens.

In another aspect of the optical switch according to the present invention, the lens associated with the light emitter is used for collimating the light.

In another aspect of the optical switch according to the present invention, the lens associated with the first and second light receivers is used for converging the light.

In another aspect of the optical switch according to the present invention, the optical fiber is a tapered optical fiber which includes a core extending in the longitudinal axis thereof and extended in diameter toward an end thereof adjacent to the lens.

In another aspect of the optical switch according to the present invention, the optical fiber has an end surface, the end surface being slanted to the longitudinal axis, allowing the light to reflect out of the core of the optical fiber.

In another aspect of the optical switch according to the present invention, the light emitter and at least one of the first and second light receivers each have a collimator equipped optical fiber which includes a lens in the form of cylinder and an optical fiber optically connected to the lens.

An optical switching apparatus of the present invention includes first and second optical inlets and first and second optical outlets arranged in a parallel fashion and reflecting means having four reflectors. The reflectors are spaced apart from one ends of the optical inlets and outlets. The switching apparatus further includes a switch for moving the reflectors between first and second arrangements. In the first arrangement, the reflecting means reflects light from the first and second inlets into the first and second outlets, respectively. In the second arrangement, on the other hand, the reflecting means reflects light from the first and second inlets into the second and first outlets, respectively.

In another aspect of the optical switching apparatus according to the present invention, the four reflectors includes two fixed reflectors and two movable reflectors. The two movable reflectors takes a first position in the first arrangement and takes a second position in the second arrangement.

In another aspect of the optical switch according to the present invention, the switch further includes two movable members for supporting the two movable reflectors, respectively, and a moving mechanism for moving the two movable members between the first and the second position.

Another optical switching apparatus of the present invention has four optical paths, including first and second optical inlets and first and second optical outlets, arranged in a parallel fashion. A movable member spaced apart from one ends of the optical inlets and outlets includes two neighboring large reflective surfaces and four neighboring small reflecting surfaces. The two neighboring large reflecting surfaces are arranged in the form of L so that they define a right angle therebetween. The four small reflective surfaces are arranged in a zigzag fashion so that they define a right angle therebetween. Provided also is a mechanism which moves the movable member between first and second states. In the first state, the light from the first and second optical inlets are reflected at the large reflective surfaces into the first and second optical outlets. In the second state, on the other hand, the light from the first and second optical inlets are reflected at the small reflective surfaces into the second and first optical outlets.

BRIEF DESCRIPTION OF THE DRAWINGS

The invention will be described in greater detail with reference to certain preferred embodiments thereof and the accompanying drawings, wherein:

FIG. 3A is a plan view of an optical switching device including the optical switch shown in FIG. 1A, in which light from two optical fibers are directly transmitted into two other optical fibers;

FIG. 3B is a plan view of the optical switching device shown in FIG. 3A, in which light from two optical fibers is reflected by the optical switches into two other optical fibers;

FIG. 24 shows arrangements of light inputs and outputs channels;

FIGS. 25A1 to 25C2 show arrangements of the reflectors;

FIG. 34 is a perspective view of another optical switching device of the present invention;

DETAILED DESCRIPTION OF THE PREFERRED EMBODIMENTS

Figure 1A:
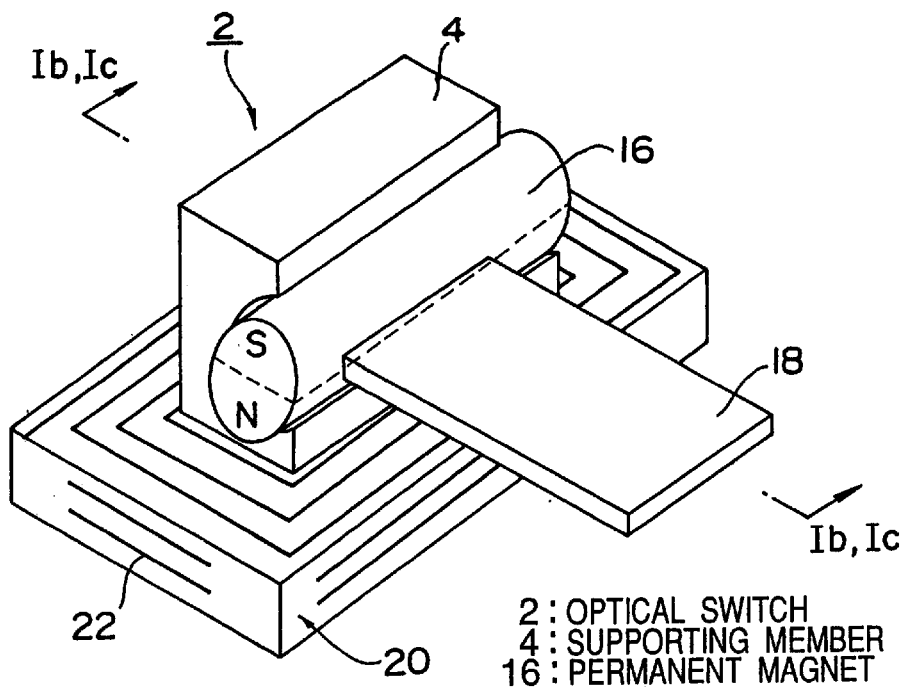
FIG. 1A is a perspective view of an optical switch in accordance with the invention.

Referring to the drawings, a variety of preferred embodiments of the present invention will be described hereinafter, wherein like reference numbers and letters designate like parts and assemblies throughout the drawings.

Figure 1B:
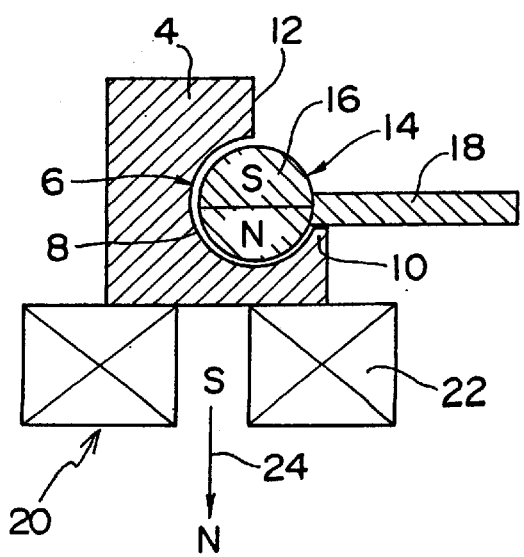
FIG. 1B is a cross sectional view of the optical switch in FIG. 1A in which a mirror is in the first position, taken along lines Ib—Ib.
Figure 1C:
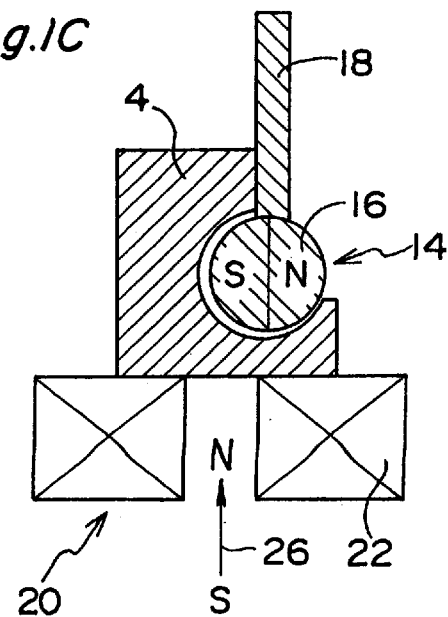
FIG. 1C is a cross sectional view of the optical switch in FIG. 1A in which the mirror is in the second position, taken along lines Ic—Ic.

FIGS. 1A to 1C show an optical switch of a first preferred embodiment according to the invention, generally designated by the numeral 2. The optical switch 2 has a supporting member 4. The supporting member 4, which is made of a non-magnetic material, has an elongate groove 6 extended into the supporting member 4. As best shown in FIGS. 1B and 1C, the elongate groove 6 has a cylindrical supporting portion 8 extending circumferentially from about three to twelve o'clock in the clockwise direction and thereby opened from about twelve to three o'clock. The supporting member 4 has a first stop 10 or wall extending horizontally from one circumferential open end (i.e., three o'clock end) of the groove 6 and a second stop 12 or wall extending vertically from the other circumferential open end (i.e., twelve o'clock end) of the groove 6.

A movable member generally indicated by reference numeral 14 includes a permanent magnet 16 in the form of cylinder having an outer diameter slightly smaller than an inner diameter of the cylindrical supporting portion 8.

The permanent magnet 16 is magnetized with magnetic poles of opposite polarities, i.e., North pole and South pole, in opposite sides divided by an intermediate plane extending along an longitudinal axis of the magnet 16. The movable member 14 also has a rectangular mirror 18 which is fixed on an outer surface of the permanent magnet 16 and positioned in the intermediate plane running between N and S pole sides of the magnet 16. As shown in FIGS. 1A to 1C, the movable member 14 is supported by the supporting member 4 so that the magnet 16 is received in the cylindrical supporting portion 8 with the mirror 16 projected therefrom, so that the movable member 14 can rotate between a first position where the mirror 18 abuts the first stop 10 (see FIG. 1B) and a second position where the mirror 18 abuts the second stop 12 (see FIG. 1C).

An electromagnetic device 20, or means for producing a magnetic field, underlying the supporting member 4 includes a coil 22 for establishing a magnetic field extending across the permanent magnet 16.

With the optical switch 2 so constructed, when an electric current is fed to the coil 22 of the electromagnetic device 20 in one direction to form a magnetic field 24 having S pole adjacent to and N pole away from the permanent magnet 16, the S pole of the magnet field 24 attracts the N pole of the permanent magnet 16, which holds the movable member 14 as its mirror 18 makes a stable contact with the first stop 10 (see FIG. 1B). As shown in FIG. 1C, once the electric current is applied to the coil 22 in the opposite direction, another magnetic field 26 having N pole adjacent to and S pole away from the permanent magnet 16 is generated. This results in that the N poles of the magnetic field 26 and the permanent magnet 16 repel each other to rotate the movable member 14 in the counterclockwise direction in FIGS. 1B and 1C. During rotation, the S pole of the permanent magnet 16 becomes closer to the N pole of the magnetic field 26, which accelerates the rotation of the movable member 14. Then, the mirror 18 is retained in the second position into engagement with the second stop 12. Again, when the electric current is applied to the coil 22 in the one direction and thereby the magnetic field 24 is generated, the S poles of the magnetic field 24 and the permanent magnet 16 in the second position repel each other. Thus, the movable member 14 is moved back to the first position.

As mentioned above, according to the optical switch 2 of the present invention, by altering the direction of electric current supplied to the coil 22 of the electromagnetic device 20, the permanent magnet 16 with the mirror 18 can move between the first and second positions.

Figure 2A:
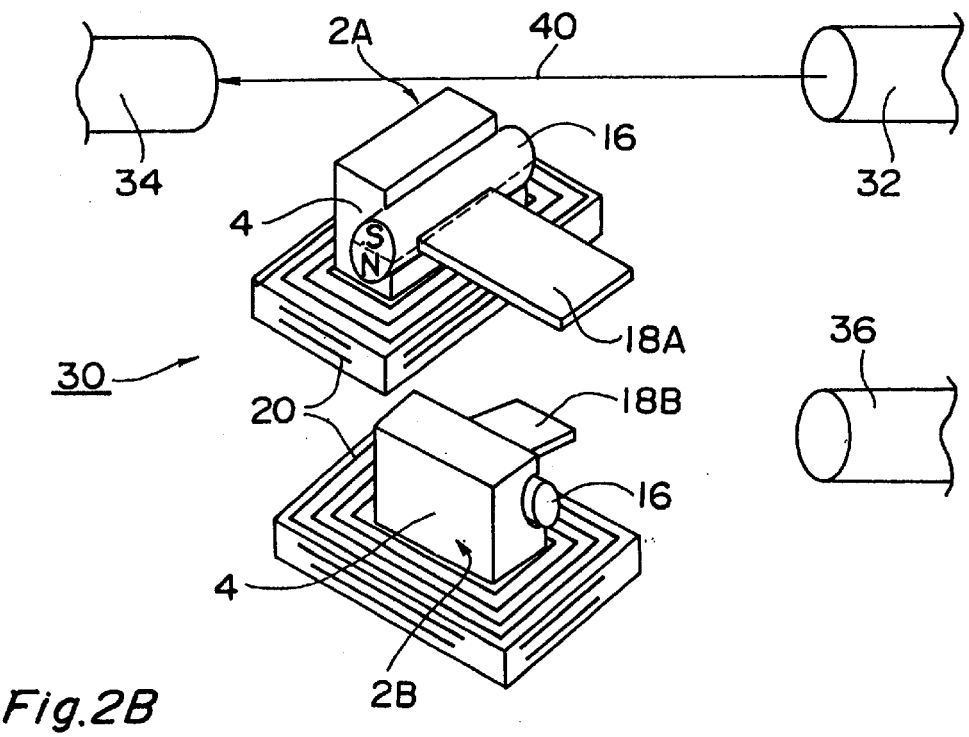
FIG. 2A is a perspective view of an optical switching device including the optical switch shown in FIG. 1A, in which light from one optical fiber is directly transmitted into an opposing optical fiber.
Figure 2B:
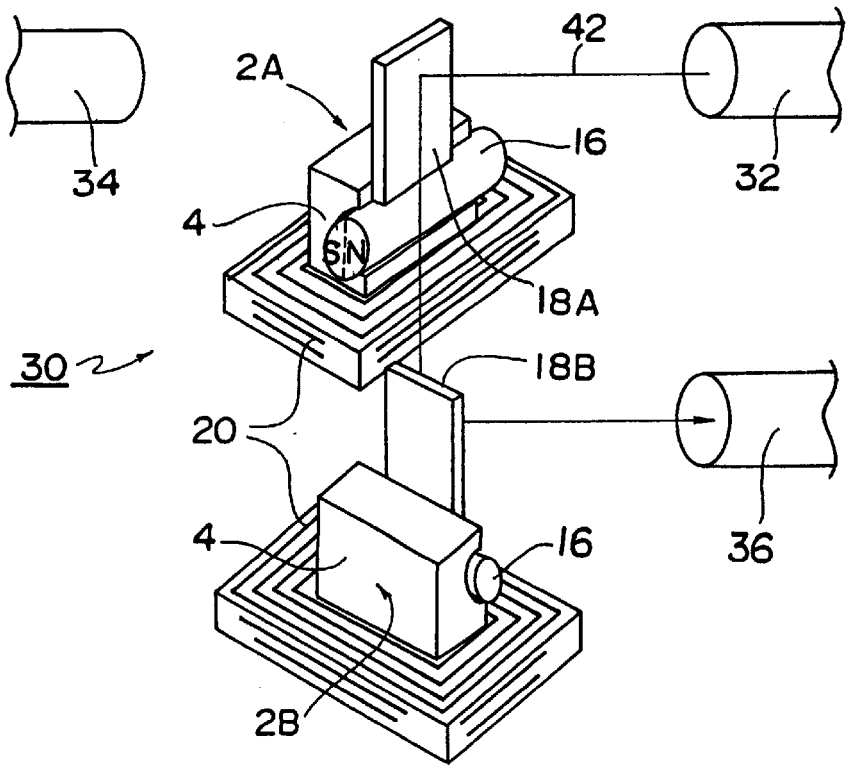
FIG. 2B is a perspective view of the optical switching device shown in FIG. 2A, in which light from one optical fiber is reflected by the optical switches into another optical fiber.

Referring now to FIGS. 2A and 2B, an optical switching device 30 utilizing the above-mentioned optical switch 2 will be described hereinafter. The device 30 includes an input optical fiber (light emitter) 32, a first output optical fiber (light receiver) 34 spaced away from and located in a linear relationship with the input optical fiber 32, and a second output optical fiber (light receiver) 36 located substantially parallel to and adjacent to the input optical fiber 32. An optical switch 2A is interposed between the input optical fiber 32 and the first output optical fiber 34. Another optical switch 2B is located at a position close to the optical switch 2A and also to an output end of the second output optical fiber 36.

The optical switch 2A is so oriented and positioned that the mirror 18A in the first position is away from a light path 40 optically connecting between the optical fiber 32 and 34, allowing light emitted from the optical fiber 32 to be directly transmitted into the optical fiber 34, and the mirror 18A in the second position is interposed between the optical fibers 32 and 36, allowing light emitted from the optical fiber 32 to be reflected by the switch 2A toward 2B. The optical switch 2B, on the other hand, is so oriented and positioned that the mirror 18B in the second position reflects the beam from the optical switch 2A toward the second output optical fiber 36.

With the optical switching device so constructed, when the mirrors 18A and 18B of the optical switches 2A and 2B are in the first position as shown in FIG. 2A, light is transmitted from the optical fiber 32 directly to the optical fiber 34. Also, when the mirrors 18A and 18B of the optical switches 2A and 2B are in the second position as shown in FIG. 2B, light emitted from the optical fiber 32 is reflected by the mirrors 18A and 18B and then enters the optical fiber 36. An optical-path in this instance is indicated at 42 in FIG. 2B. Accordingly, by altering the position of the mirrors 18A and 18B of the optical switches 2A and 2B, light emitted from the optical fiber 32 is directed selectively toward the optical fiber 34 or 36.

FIGS. 3A and 3B show another optical switching device which includes a pair of optical fibers 46A and 46B extending along a line indicated by arrow 50 in a spaced fashion. Provided adjacent to the optical fibers 46A and 46B and spaced a certain distance therefrom are a pair of optical fibers 46C and 46D extending along another line indicated by arrow 52 and parallel to the arrow 50. The switching device further has four optical switches 2A, 2B, 2C, and 2D. The former two optical switches 2A and 2B are interposed between the optical fibers 46A and 46B, and the latter two optical switches 2C and 2D are between the optical fibers 46C and 46D.

With the optical switching device so constructed, when the mirrors 18A, 18B, 18C and 18D of the optical switches 2A, 2B, 2C and 2D are in the first position (i.e. out-of-the-way position) as shown in FIG. 3A, light emitted from the optical fiber 46A is directly transmitted into the optical fiber 46B. Also, light emitted from the optical fiber 46D directly enters the optical fiber 46C. On the other hand, when the mirrors 18A, 18B, 18C and 18D are in the second position (i.e. in-the-way position) as shown in FIG. 3B, light emitted from the optical fiber 46A is reflected by the mirrors 18A and then 18C into the optical fiber 46C. Also, light emitted from the optical fiber 46D is reflected by the mirrors 18D and then 18B into the optical fiber 46B.

Figure 4A:
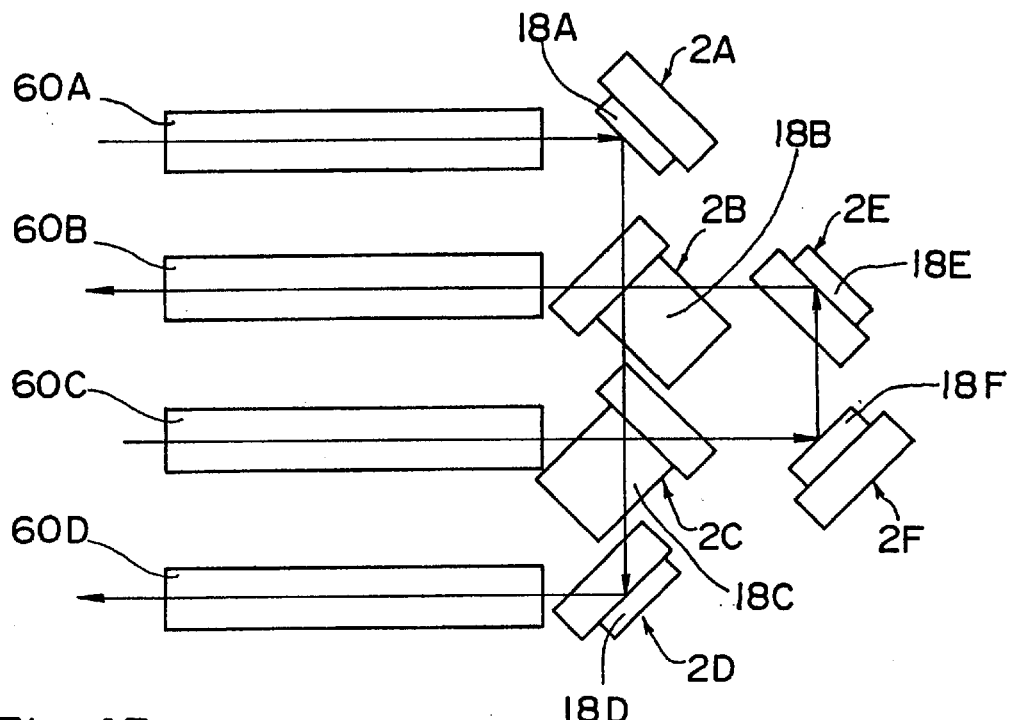
FIGS. 4A and 4B are plan views of another optical switching device of the present invention, showing different optical paths.
Figure 4B:
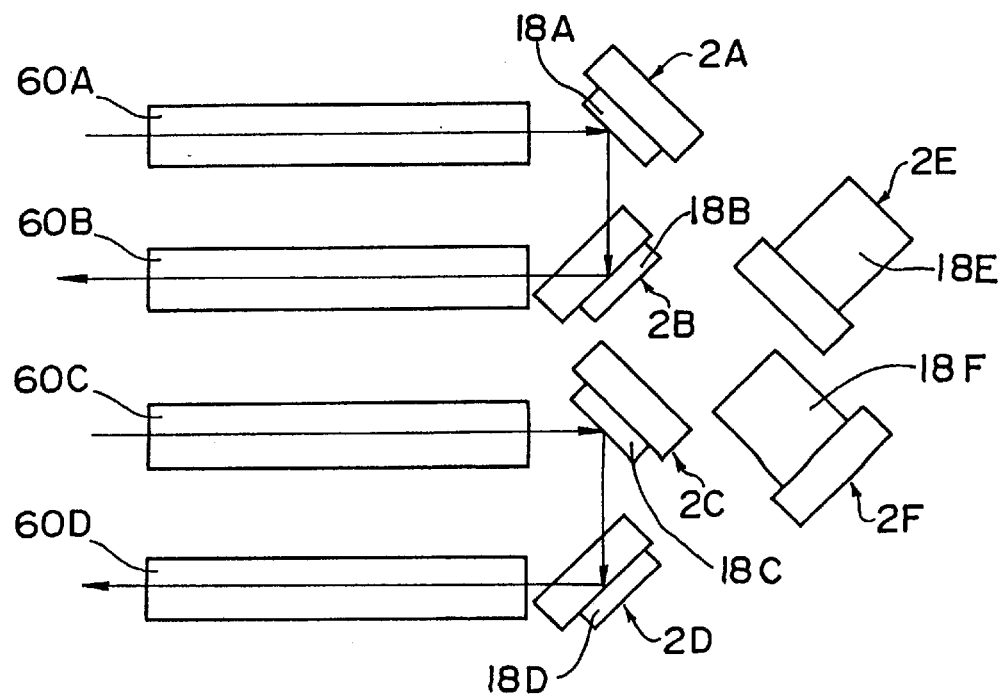

FIGS. 4A and 4B show another optical switching device including four optical fibers 60A, 60B, 60C and 60D arranged in a parallel fashion. The device further has six optical switches 2A, 2B, 2C, 2D, 2E and 2F located on one side adjacent to one ends of optical fibers 60A–60D. More specifically, the optical switches 2A, 2B, 2C or 2D are each located adjacent to one ends of the optical fibers 60A, 60B, 60C and 60D, leaving a certain gap from the one ends of the respective optical fiber. The optical switches 2E and 2F are also positioned to oppose to one ends of the optical fibers 60B and 60C, respectively, so that the optical switch 2B is interposed between the optical fiber 60B and the optical switch 2E, and the optical switch 2C between the optical fiber 60C and the optical switch 2F.

The optical switching device alternately takes two states. In the first state which is shown in FIG. 4A, the mirrors 18B and 18C of the optical switches 2B and 2C are in the first position and the remaining mirrors 18A, 18D, 18E and 18F of the optical switches 2A, 2D, 2E and 2F are in the second position. In the second state, on the other hand, which is shown in FIG. 4B, the mirrors 18A, 18B, 18C and 18D of the optical switches 2A, 2B, 2C and 2D are in the second position and the remaining mirrors 18E and 18F of the optical switches 2E and 2F are in the first position. Accordingly, in the first state, light emitted from the optical fiber 60A is reflected by the mirror 18A and then 18D into the optical fiber 60D. On the other hand, light emitted from the optical fiber 60C is reflected by the mirrors 18F and then 18E into the optical fiber 60B. In the second state, light emitted from the optical fiber 60A is reflected by the mirrors 18A and then 18B into the optical fiber 60B. Light emitted from the optical fiber 60C is reflected by the mirrors 18C and then 18D into the optical fiber 60D.

Figure 5:
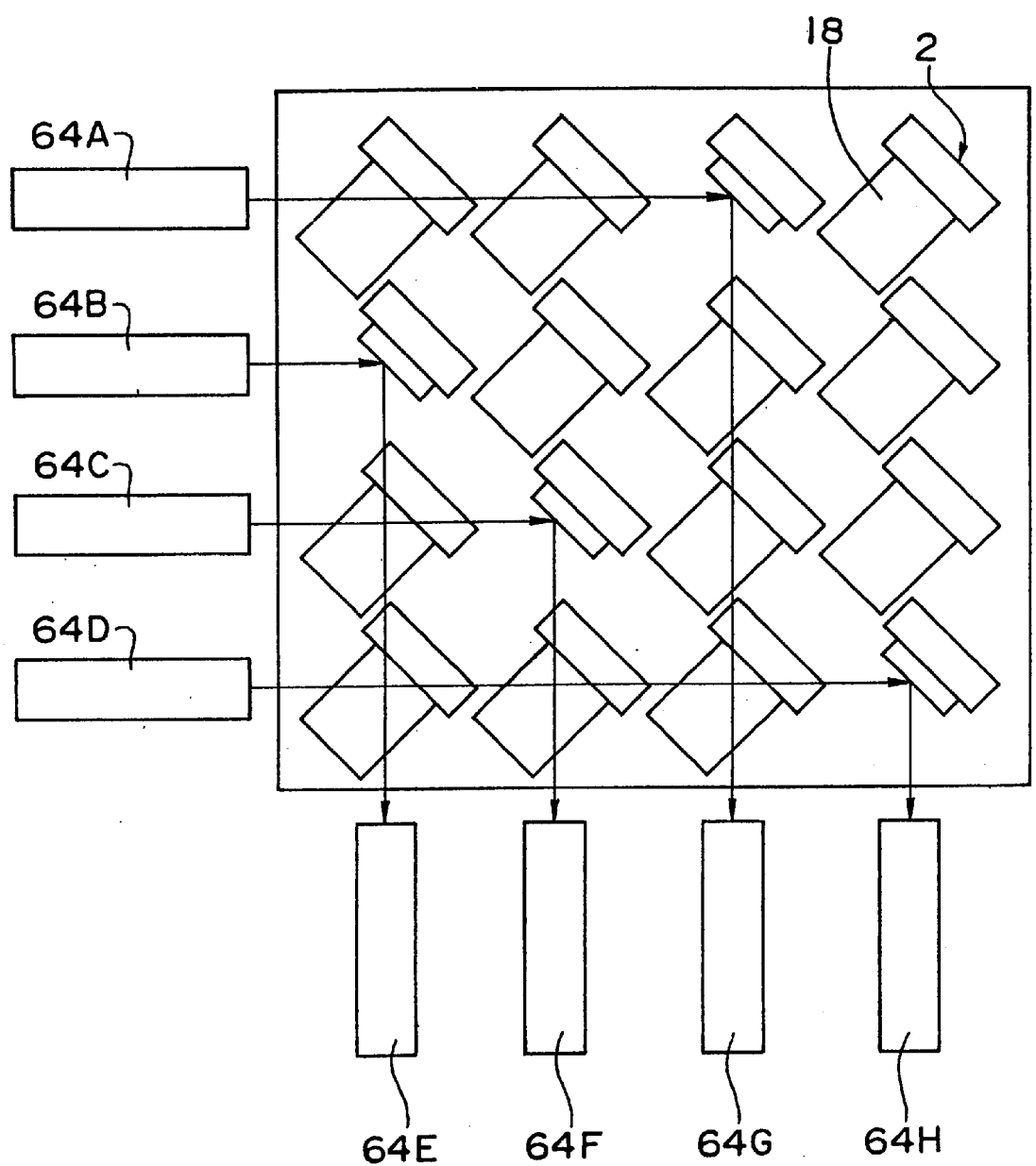
FIG. 5 is a plan view of another optical switching device of the present invention.

FIG. 5 shows another optical switching device including 16 optical switches 2 arranged in a 4×4 matrix. Eight optical fibers 64A–64H are also located, one for each of extension lines of four rows and four columns of the matrix, so that, by moving the mirrors to a desired position, light emitted from one of the optical fibers 64A–64D is transmitted to one of the optical fibers 64E–64H.

Figure 6A:
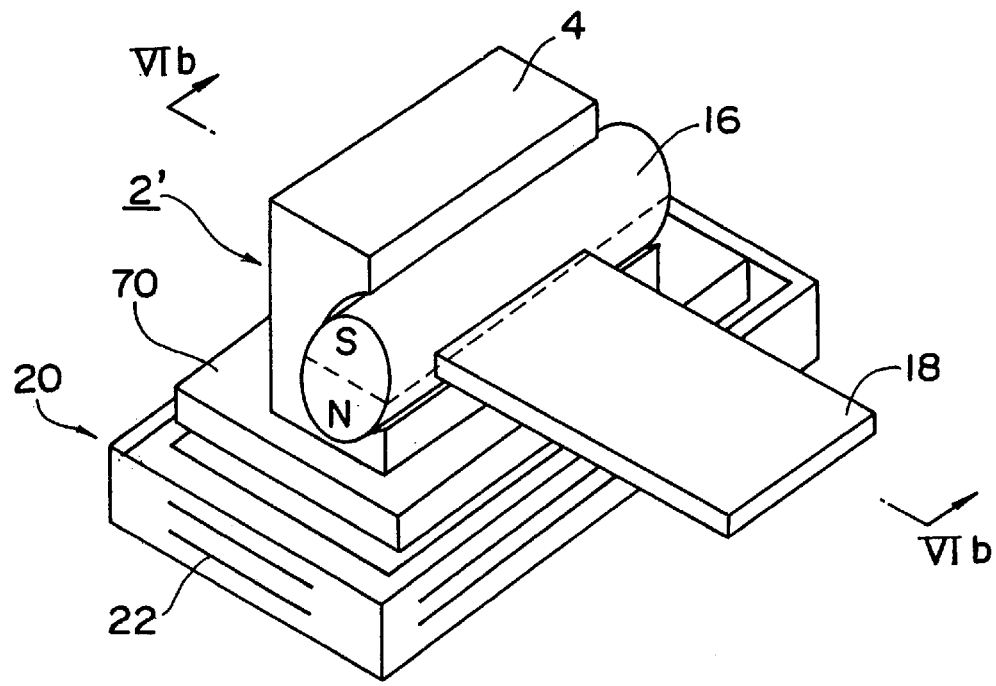
FIG. 6A is a perspective view of another optical switch of the present invention.
Figure 6B:
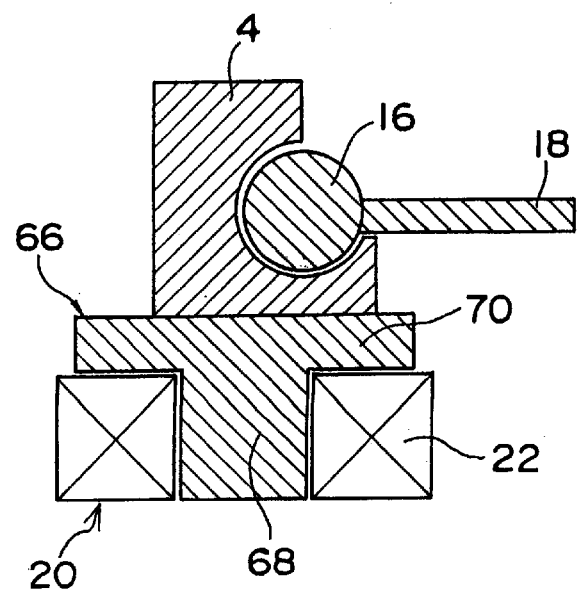
FIG. 6B is a cross sectional view of the optical switch in FIG. 6A taken along lines VIb—VIb, in which a mirror is in the first position.

FIGS. 6A and 6B show another optical switch 2' of the present invention. The optical switch 2' is similar to the optical switch 2 described above except that the electromagnetic device 20 further includes a magnetic component 66. The magnetic component 66 has an iron core 68 inserted into the coil 22, and a flange 70 lying between the coil 22 and the supporting member 4. In operation of the optical switch 2', when electric current is supplied to the coil 22, a magnetic field generated is converged substantially on the magnetic component 66, which provides the permanent magnet 16 with a greater rotational force.

Figure 7A:
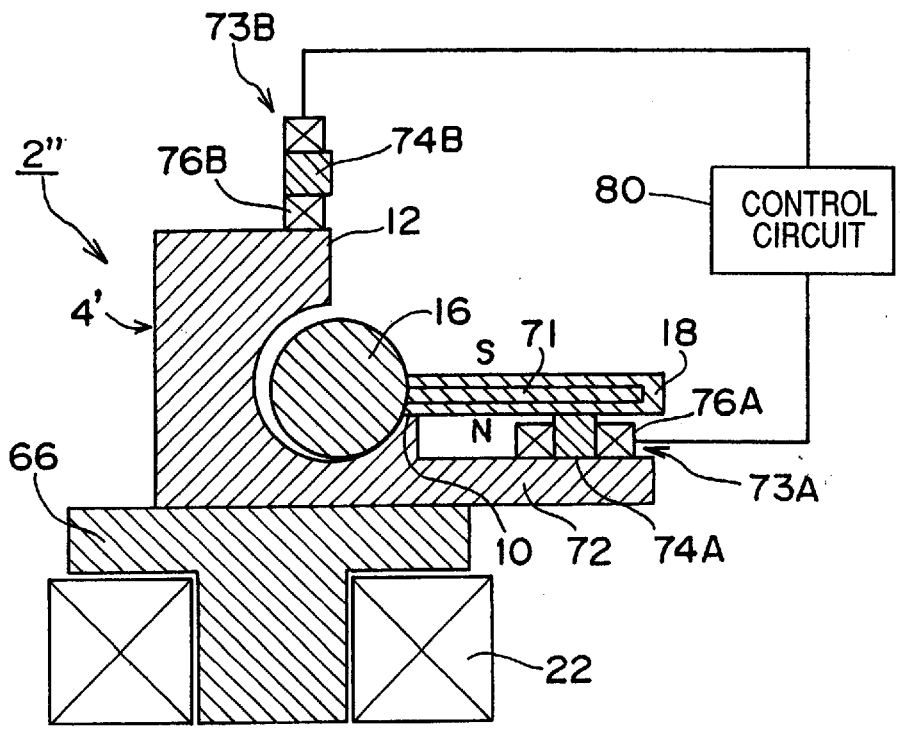
FIG. 7A is a cross sectional view of another optical switch, in which the mirror is in the first position.
Figure 7B:
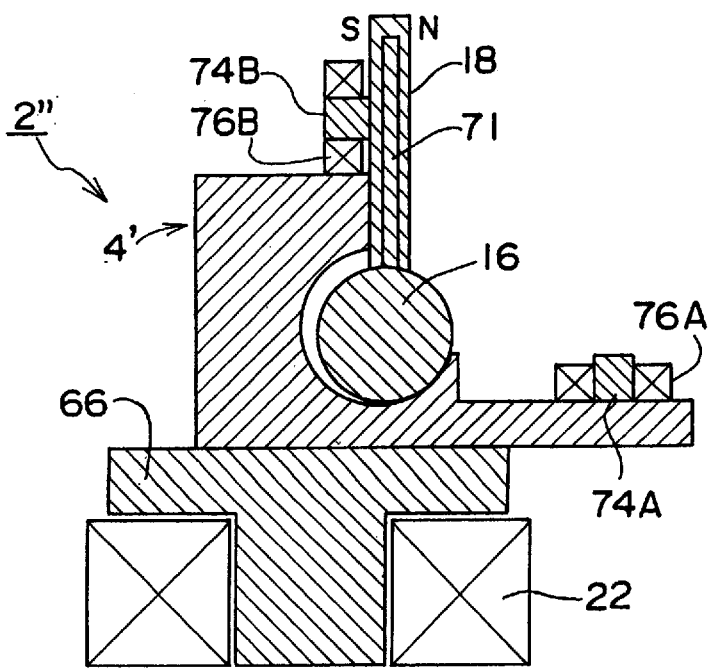
FIG. 7B is a cross sectional view of another optical switch, in which the mirror is in the second position.

FIGS. 7A and 7B show another optical switch 2" including a permanent magnet 71 mounted on the mirror 18. The permanent magnet 71 has a first surface portion positioned on one surface of the mirror 18 (lower surface in FIG. 7A), magnetized with N pole and a second surface portion on the opposite surface portion of the mirror 18 (upper surface in FIG. 7A) magnetized with S pole. The permanent magnet 71 is so magnetized that, when it is in the first position shown in FIG. 7A, its N pole faces downwardly and its S pole faces upwardly. The supporting member 4' has a portion 72 extending horizontally from beneath the first stop 10 of the supporting member 4'. In addition, an electromagnetic device 73A having an iron core 74A and a coil 76A wound about the core 74A is mounted on the extension 72, so that the mirror 18 abuts against the iron core 74A when the mirror 18 is in the first position. An electromagnetic device 73B having an iron core 74B and a coil 76B wound about the core 74B is mounted above and adjacent to the second stop 12, so that the mirror 18 abuts against the iron core 74B when the mirror 18 is in the second position. The coils 76A and 76B are connected to a control circuit 80, so that the control circuit 80 controls the direction of electric current applied to the coils 76A and 76B.

With this optical switch 2" thus constructed, when the mirror 18 is in the first position (see FIG. 7A), the permanent magnet 71 keeps in contact with the iron core 74A by the attraction force generated between the permanent magnet 71 and the iron core 74A, thus permitting the mirror 18 to be held in the first position, without application of electric current to the coil 76A. When an electric current is next applied to the coil 76A and thereby the iron core 74A adjacent to the permanent magnet 71 is magnetized with N pole, the permanent magnet 71 and the iron core 74A repel each other, as a result of which the mirror 18 moves away from the iron core 74A. When the electric current is supplied to the coil 22 in the opposite direction, the mirror 18 is moved to the second position (see FIG. 2B). In the second position, the permanent magnet 71 attracts the iron core 74B, thus permitting the mirror 18 to be held in the second position, without any necessity for supplying electric current to the coil 76B. When electric current is next applied to the coil 76B and thereby one end of the iron core 74B adjacent to the permanent magnet 71 is magnetized with S pole, the permanent magnet 71 and the iron core 74B repel each other, as a result of which the mirror 18 moves away from the iron core 74B. When electric current direction of the coil 22 is changed again as mentioned above at substantially the same time as the magnetization of the one end of the iron core 74B, the mirror 18 is moved back to the first position.

According to the optical switch 2" of the invention, mirror 18 can be held stably in the first and second positions.

Figure 8A:
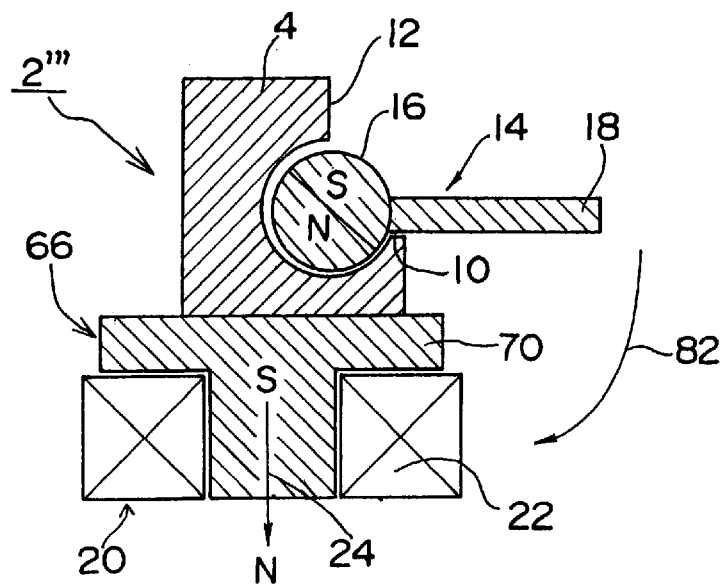
FIG. 8A is a cross sectional view of another optical switch, in which the mirror is in the first position.
Figure 8B:
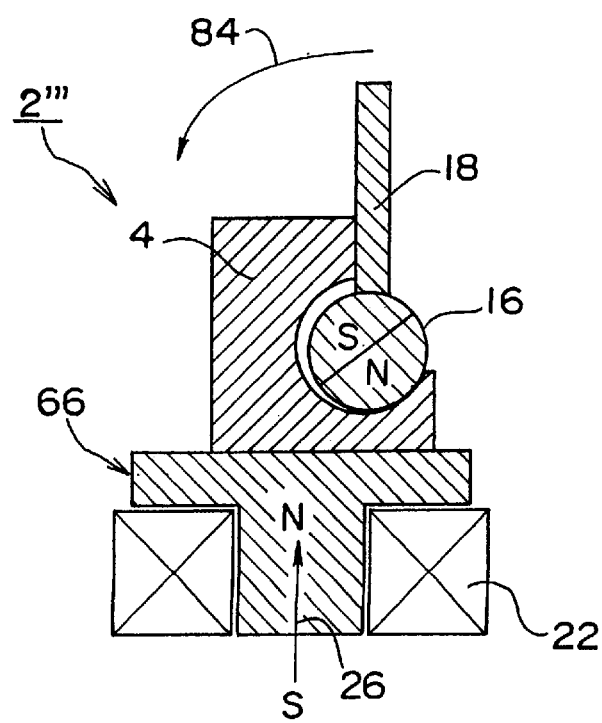
FIG. 8B is a cross sectional view of another optical switch with a mirror in the second position.

FIGS. 8A and 8B show another optical switch 2'" of the present invention. In the optical switch 2'", although in the previous embodiments the mirror 18 extends in the plane running between N and S pole sides of the permanent magnet 16, the mirror 18 is rotated in the counterclockwise direction at about 45 degrees relative to the permanent magnet 16 so that it is oriented obliquely against to the plane.

With such configuration, when electric current is fed to the coil 22 of the electromagnetic device 20 to form the magnetic field 24 having S pole in the region adjacent to the permanent magnet, the S pole of the magnetic field 24 attracts the N pole of the permanent magnet 16. As a result, the mirror 18 is rotated in the direction indicated by arrow 82, and is held in the first position against the first stop 10 (see FIG. 8A). Therefore, even if the electric current supplied to the coil 22 is then turned off, the permanent magnet 16 cooperates with the magnetic component 66 to keep a rotating force in the direction of arrow 82 to force the permanent magnet 16 into a stable state in which the plane between the two magnetic poles would extend perpendicular to the upper surface of the flange 70) between the permanent 16 and the magnetic component 66. However, the mirror 18 is prevented from rotating in the direction by the first stop 10 as it is forced against the stop 10. The electric current direction is then changed to form another magnetic field 26 with its N pole opposed to the permanent magnet 16, as shown in FIG. 8B. Thus, the N poles of the magnetic field 26 and the permanent magnet 16 repel each other. As a result, the mirror 18 is rotated in the direction indicated by arrow 84, and is then held in the second position adjacent to the second stop 12. Therefore, even if the electric current supplied to the coil 22 is turned off again, the permanent magnet 16 cooperates with the magnetic component 66 to keep a rotating force in the direction of arrow 84 to force the permanent magnet 16 into a stable state. However, the mirror 18 is prevented from rotating in the direction by the second as it is forced against the stop 12. Finally, the electric current direction is changed to form the magnetic field 24. Thus, with the resultant repellant force between the S pole of the magnetic field 24 and the S pole of the permanent magnet 16 in the second position, the mirror 18 is rotated back to the first position.

As described above, by virtue of the self-holding feature of the optical switch 2'" of the invention, the mirror 18 can be held stably in the first and second positions.

Figure 9A:
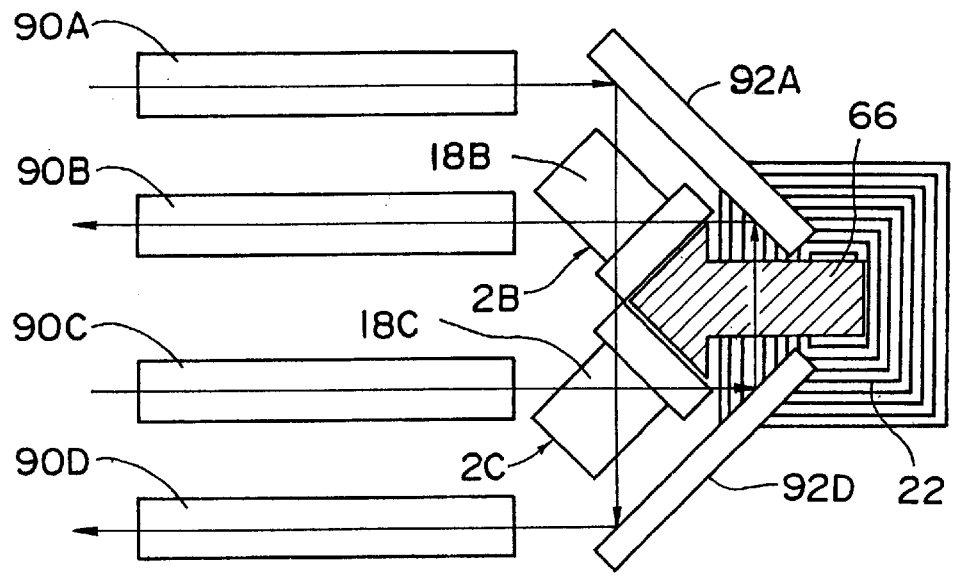
FIG. 9A is a plan view of another optical switching device, in which the mirrors are in the first state.
Figure 9B:
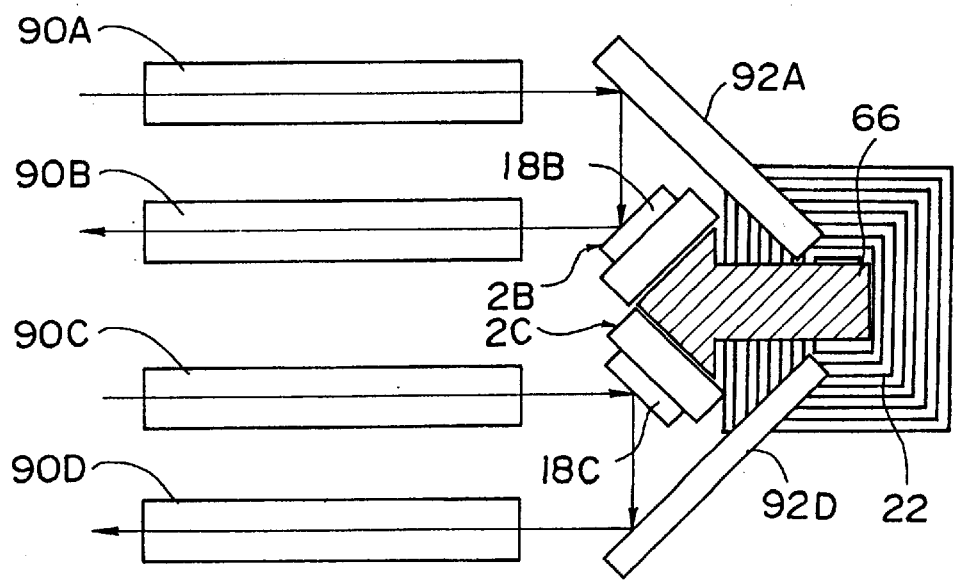
FIG. 9B is a plan view of another optical switching device, in which the mirrors are in the second state.

FIGS. 9A and 9B show another optical switching device including four parallel optical fibers 90A, 90B, 90C, and 90D. The device further includes two optical switches 2B and 2C and two fixed mirrors 92A and 92D, located adjacent to one ends of the optical fibers 90A–90D. More specifically, the optical switches 2B and 2C are located on extended lines of the optical fibers 90B and 90C, respectively, and are spaced a certain distance away from the one ends of the optical fibers, respectively. The fixed mirror 92A is located so that one end portion thereof opposes to and spaces away from the one end of the neighboring optical fiber 90A and the opposite end portion thereof opposes to and spaces away from the neighboring optical fiber 90B with the optical switch 2B positioned therebetween. The fixed mirror 92D, on the other hand, is located so that one end portion thereof opposes to and spaces away from the one end of the neighboring optical fiber 90D and the opposite end portion thereof opposes to and spaces away from the neighboring optical fiber 90C with the optical switch 2C positioned therebetween. In addition, the optical switches 2B and 2C share the coil 22 and the magnetic component 66.

The optical switching device alternately takes first and second states (see FIGS. 9A and 9B, respectively), simply by changing a direction of electric current flowing in the coil 22 used for optical switches 2B and 2C. In the first state the mirrors 2B and 2C of the optical switches 18B and 18C are in the first position, and in the second state the mirrors 2B and 2C of the optical switches 18B and 18C are in the second position. Also, in the first state, light emitted from the optical fiber 90A is reflected by the fixed mirrors 92A and then 92D into the optical fiber 90D. Light emitted from the optical fiber 90C is also reflected by the fixed mirrors 92D and then 92A into the optical fiber 90B. In the second state, light emitted from the optical fiber 90A is reflected by the fixed mirror 92A and then the mirror 18B of the optical switch 2B into the optical fiber 90B. Light emitted from the optical fiber 90C is reflected by the mirror 18C of the optical switch 2C and then the fixed mirror 18D into in the optical fiber 90D.

Figure 10:
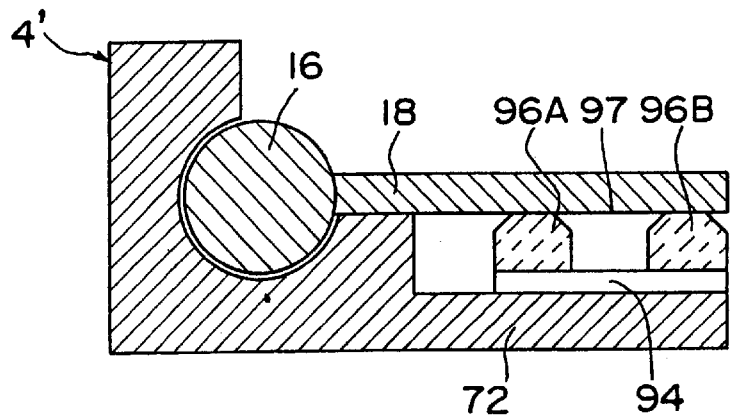
FIG. 10 is a cross sectional view of another optical switching device.

FIG. 10 shows another optical switching device. The optical switch used in this device includes a supporting member 4' which is formed with a lateral extension 72 extending substantially parallel to and spaced a certain distance from the mirror 18 in the first position. An insulating layer 94 is formed on the extension 72. Also, a pair of spaced terminals 96A and 96B, which are electrically insulated from each other, is located on the insulating layer 94. Additionally, the mirror 18 is provided at one surface portion 97 thereof adjacent to the terminals 96A and 96B with a suitable conductive material so that the surface portion 97 makes an electrical contact with the terminals 96A and 96B when the mirror 18 is in the first position. Moreover, the pair of terminals 96A and 96B is connected to a detection circuit (not shown), so that the detection circuit can detect if the terminals 96A and 96B are electrically connected to each other through the conductive surface portion 97. Thus, according to this optical switching device, it can be determined if the mirror 18 is in the first position.

In this embodiment, the pair of terminals insulated from each other is located close to the mirror 18 in the first position. Although in this embodiment the terminals insulated from each other are positioned so that the mirror can be detected as it takes the first position, another pair of insulated terminals may be arranged to detect the mirror as it takes the second position. In this instance, the opposite surface portion of the mirror should of course be provided with an electrically conductive material capable of electrically connecting the terminals when the mirror takes the second position. This also allows the mirror to be detected when it takes the second position.

Figure 11:
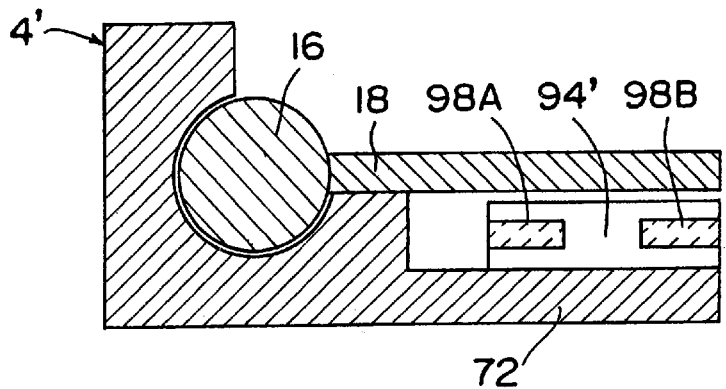
FIG. 11 is a cross sectional view of another optical switching device.

FIG. 11 shows another optical switching device which is a modification of that shown in FIG. 10. In this modification, the extended portion 72 supports an insulating layer 94' made of a insulating material which opposes to the mirror 18 in the first position. The insulating layer 94' includes a pair of spaced and insulated electrodes 98A and 98B. The mirror 18, on the other hand, is formed at its portion facing the insulating layer 94' by an electrically conductive material.

With this optical switching device, when the mirror 18 is in the first position shown in FIG. 11, the conductive portion of the mirror 18 is adjacent to the electrodes 98A and 98B, which maximizing a capacitance between the electrodes 98A and 98B. In contrast, as the conductive part of the mirror 18 moves away from the electrodes 98A and 98B, the capacitance therebetween decreases gradually. Accordingly, by detecting capacitance variation with a detector (not shown) connected to the electrodes 98A and 98B, the position of the mirror 18 can be determined.

Figure 12:
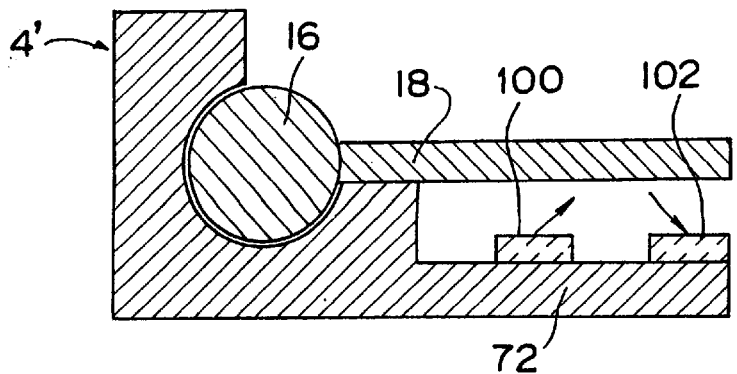
FIG. 12 is a cross sectional view of another optical switching device.

FIG. 12 shows another optical switching device which is a modification of that shown in FIG. 10. In this modification, a light emitting element 100 and a light receiving element 102 are located on the extension 72, leaving a space gap from the mirror 18 in the first position. The light emitting element 100 emits light when it is applied with an electric signal. The light receiving element 102, on the other hand, produces an electric signal when it receives light.

With the optical switching device, when the mirror 18 is in the first position shown in FIG. 12, in which the mirror 18 is located above the elements 100 and 102, light emitted from the element 100 is reflected by the mirror 18 and then received by the element 102. On the other hand, when the mirror 18 is in the second position, no light from the element 100 is reflected by the mirror 18 and then received by the element 102. Accordingly, by detection of an electric signal with a detector (not shown), it can be determined whether the mirror 18 is in the first or in the second position.

Figure 13:
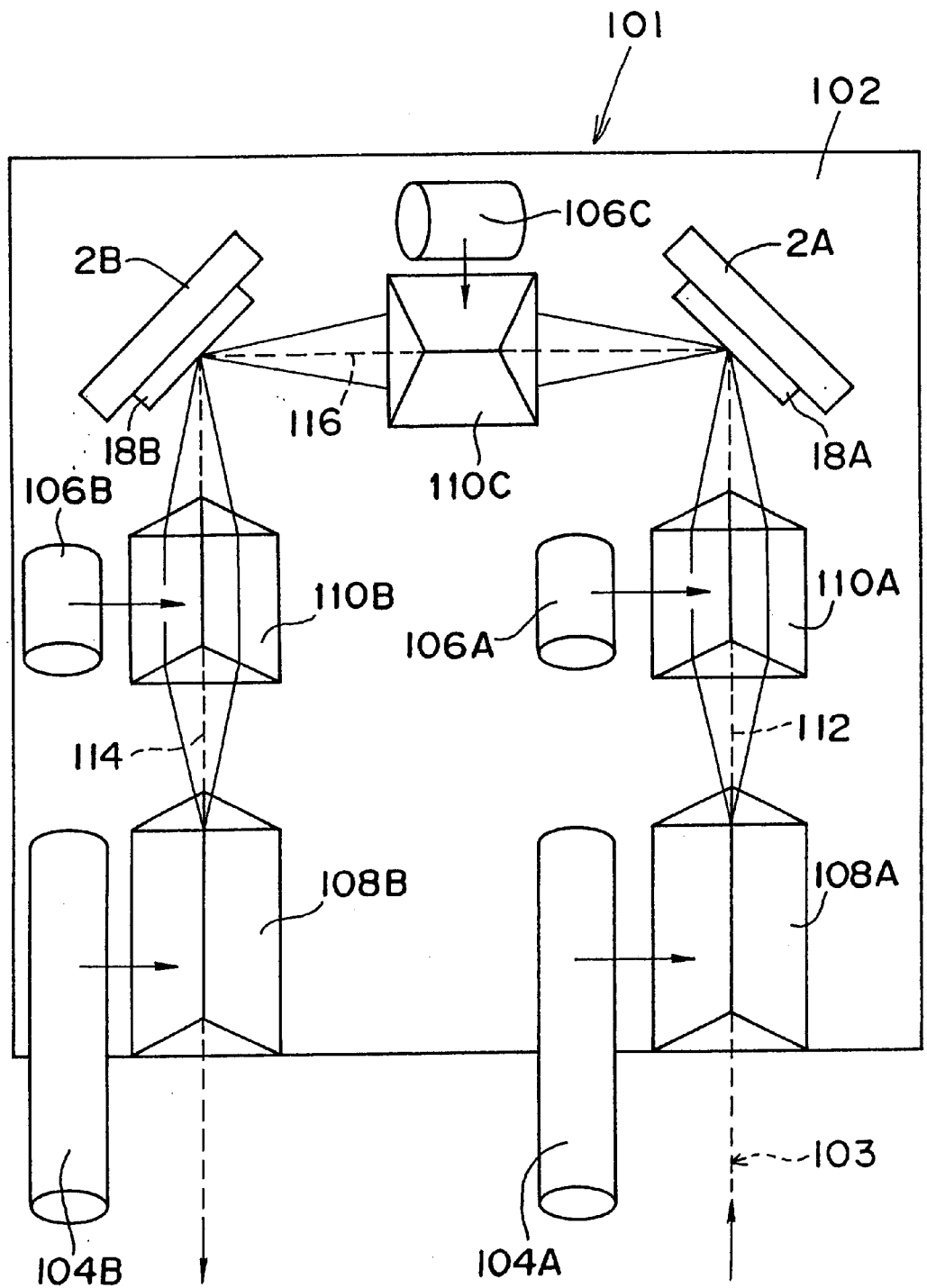
FIG. 13 is a plan view of another optical switching device of the present invention.

FIG. 13 shows another optical switching device, which includes a base 101 having a top planer surface 102. The top surface 102 supports, along its optical axis 103, an optical fiber 104A, a lens 106A, an optical switch 2A, a lens 106C, an optical switch 2B, a lens 106B, and an optical fiber 104B. Preferably, the top surface 102 is formed with V-shaped grooves or portions 108A, 108B, 110A, 110B, and 110C for holding the optical fibers 104A and 104B, and the lenses 106A, 106B and 106c, respectively. In addition, the optical axis 103 has two substantially parallel lines 112 and 114, and a line 116 substantially perpendicular to the lines 112 and 114.

In operation, light emitted from the optical fiber 104A is converged by the lens 106A and then reflected by the mirror 18A of the optical switch 2A. The reflected light is again converged by the lens 106C and then reflected by the mirror 18B of the optical switch 2B. Finally, the light is converged by the lens 106C into the optical fiber 104B.

Figure 14:
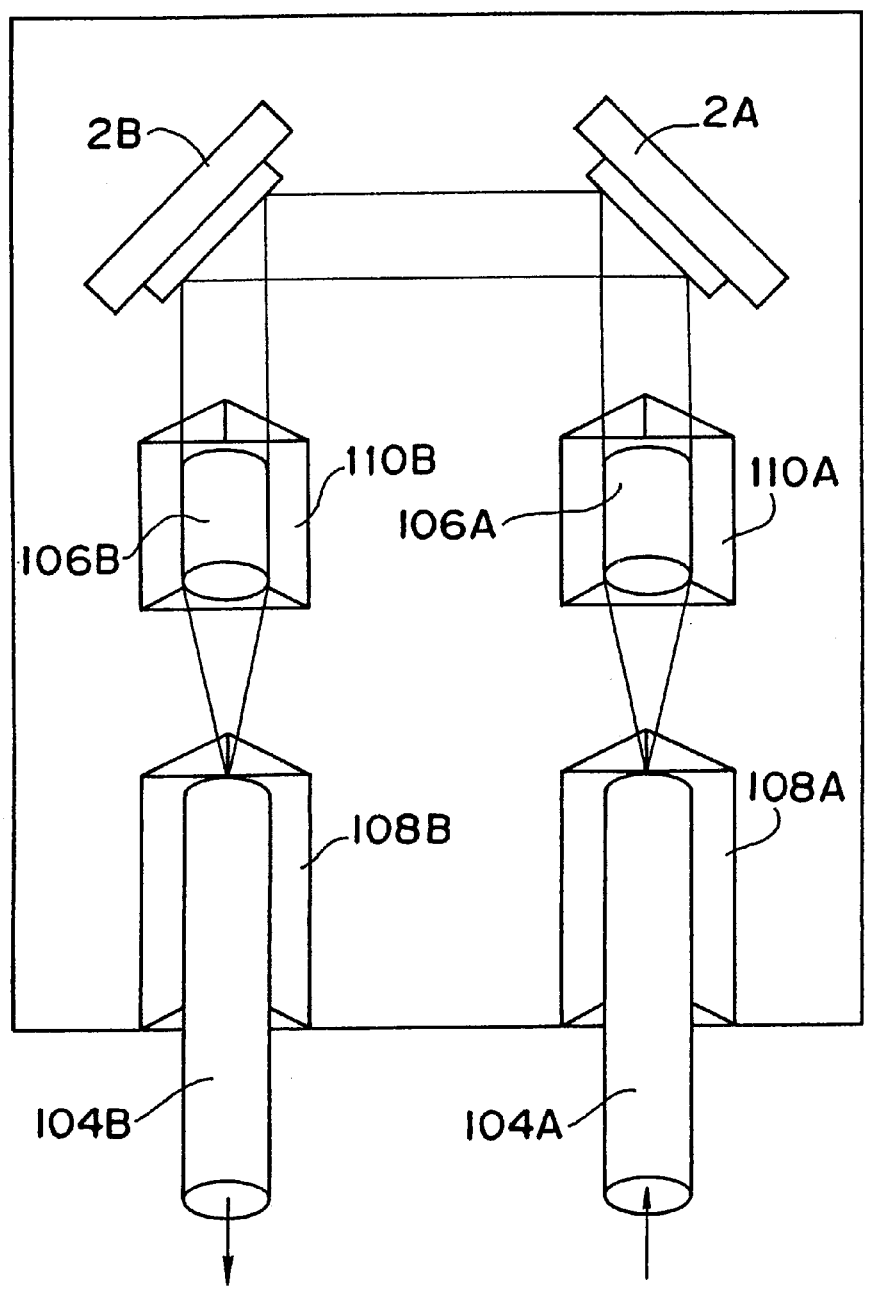
FIG. 14 is a plan view of another optical switching device.

FIG. 14 shows another optical switching device, in which the lens 106A is used for collimating light and the lens 106B for converging light. Collimated light lowers an optical transmission loss even when an arrangement of optical fibers and lenses could include some misalignment such as offset.

Figure 15:
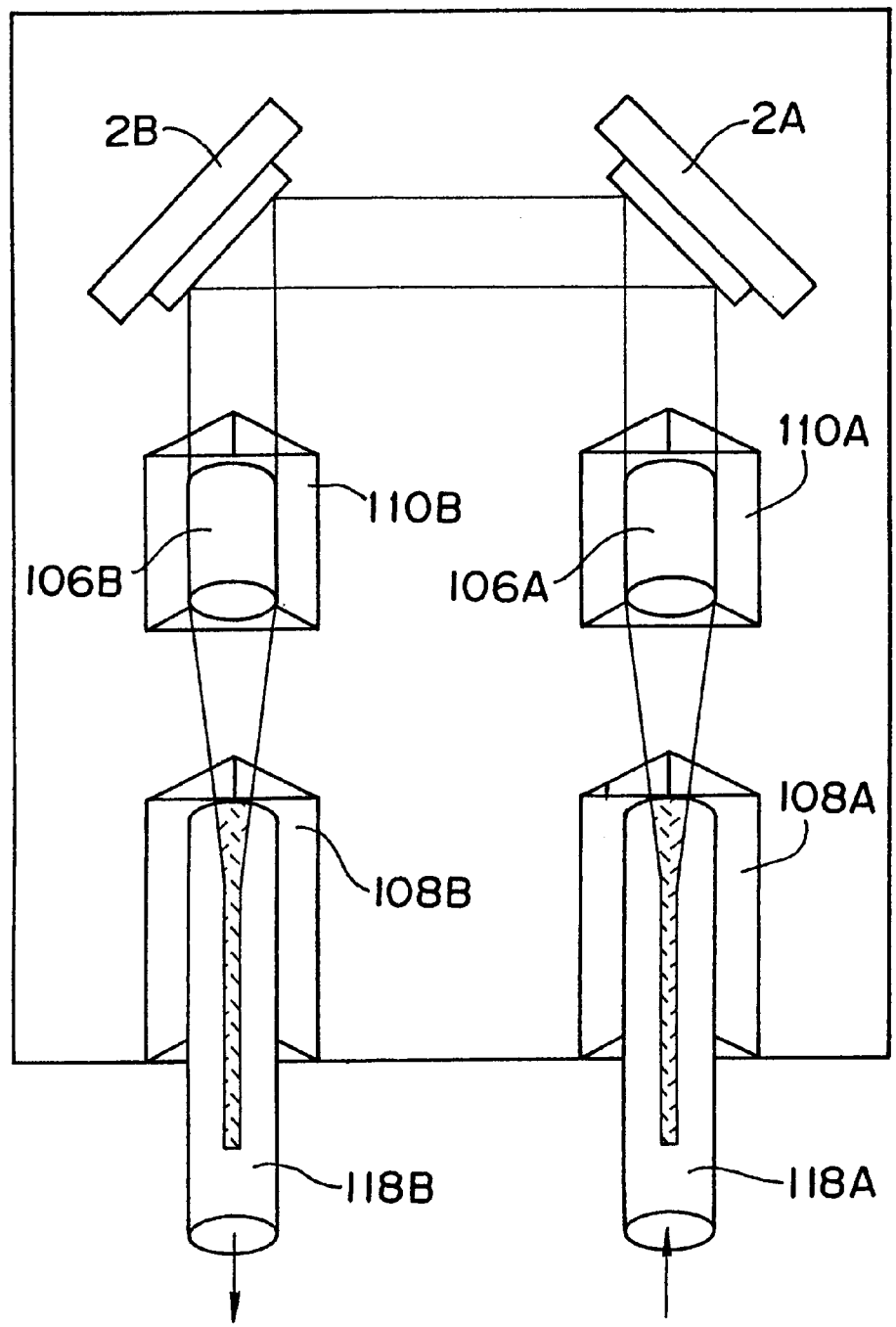
FIG. 15 is a plan view of another optical switching device.

FIG. 15 shows another optical switching device which is similar to that shown in FIG. 14 except for input and output optical fibers. Each of the optical fibers 118A and 118B of the embodiment has a core or so-called tapered core which is enlarged in diameter toward the end thereof. With the arrangement, the output optical fiber 118A emits light which is enlarged in diameter. Also, the input optical fiber 118B can receive more light than that with a core having a constant diameter. This causes the optical switching device to reduce the possible light transmission loss due to the possible misalignment of the optical elements than that using nontapered single mode optical fiber. This further eases a requirement of precision in an arrangement of optical fibers, lenses, or optical switches, which decreases a production cost of the optical switching device.

Figure 16:
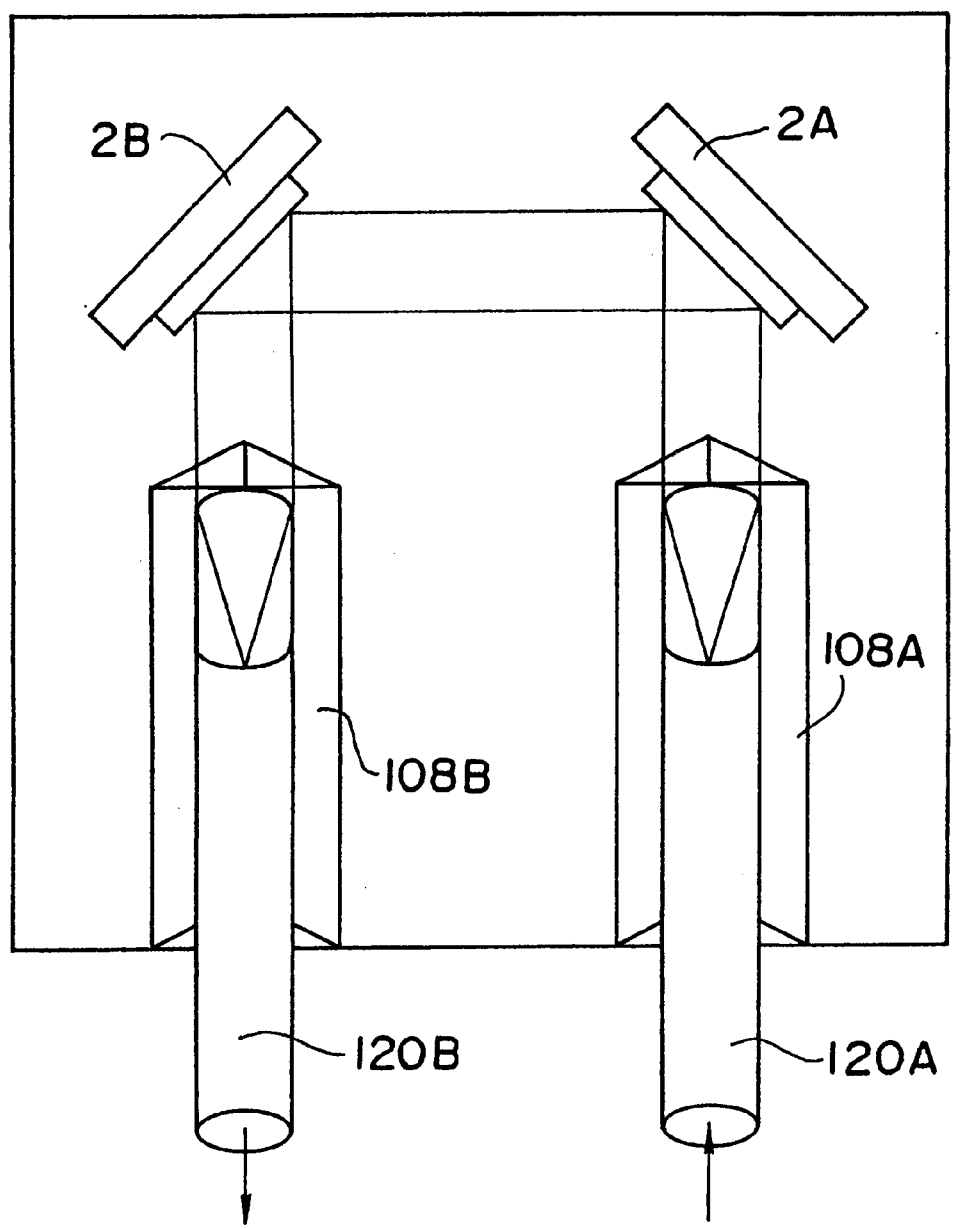
FIG. 16 is a plan view of another optical switching device.

FIG. 16 shows another optical switching device, which is similar to the device shown in FIG. 14. The device is characterized by optical fibers with an microcollimator 120A or 120B, each of which is made of a cylindrical micro-lens (for example, a graded index multimode optical fiber having core portion with lens effects) and an optical fiber (for example, a singlemode optical fiber), arranged in a coaxial fashion and welded to each other. The optical fibers 120A and 120B reduce positional deviation between the lens and optical fiber.

Figure 17:
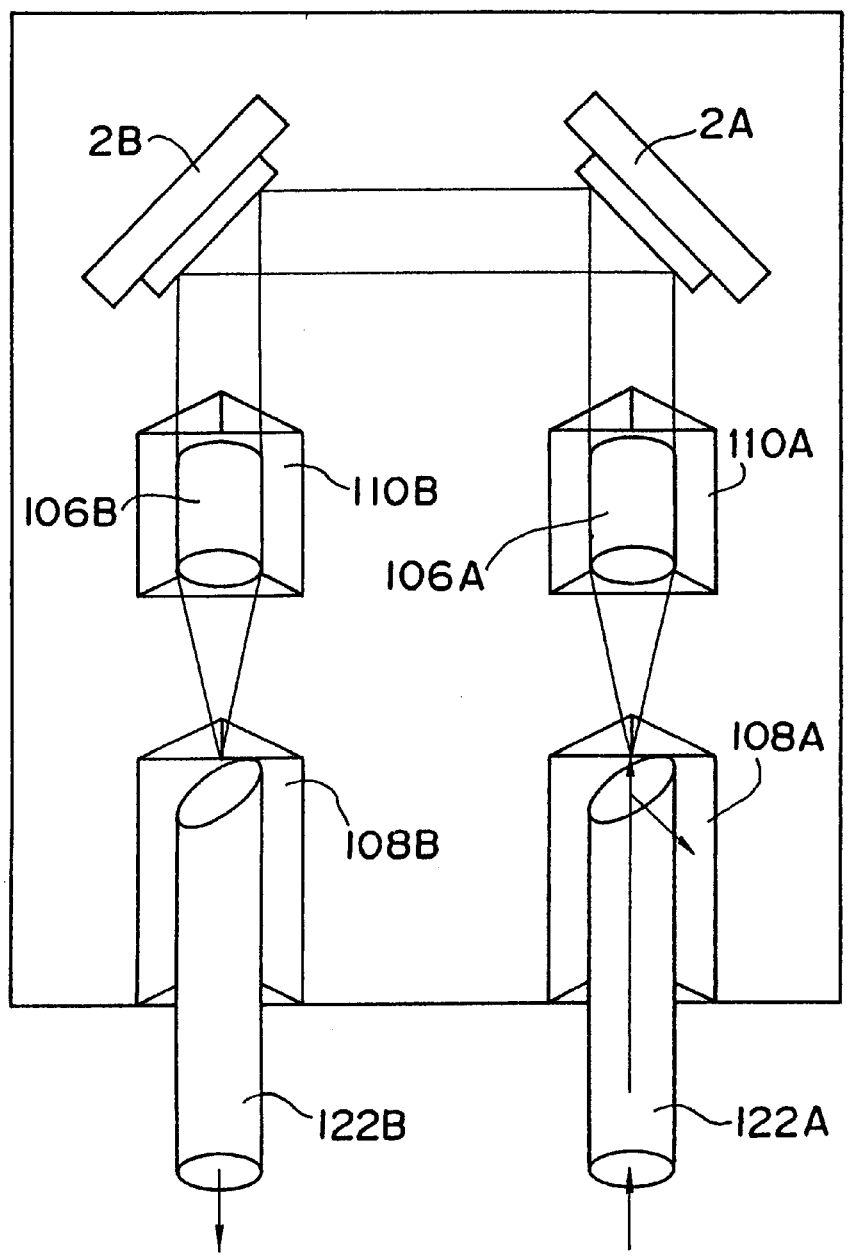
FIG. 17 is a plan view of another optical switching device.

FIG. 17 shows an optical switching similar to the device shown in FIG. 14. In this embodiment, each end face of optical fibers 122A and 122B is angled to the longitudinal axis thereof so that light travelling in the optical fiber 122A or 122B is reflected at its end face toward the outside of the core portion of the optical fiber 122A or 122B. In the meantime, generally light transmitted through an input optical fiber is partially reflected at its end face. Where the end face could extend perpendicular to the axis, a relatively large amount of reflected light is returned to the core portion. With the arrangement of the invention, however, light reflected at the end face of the optical fiber 122A or 122B leaks out of its core portion, reducing the amount of light back into the optical fiber.

Figure 18:
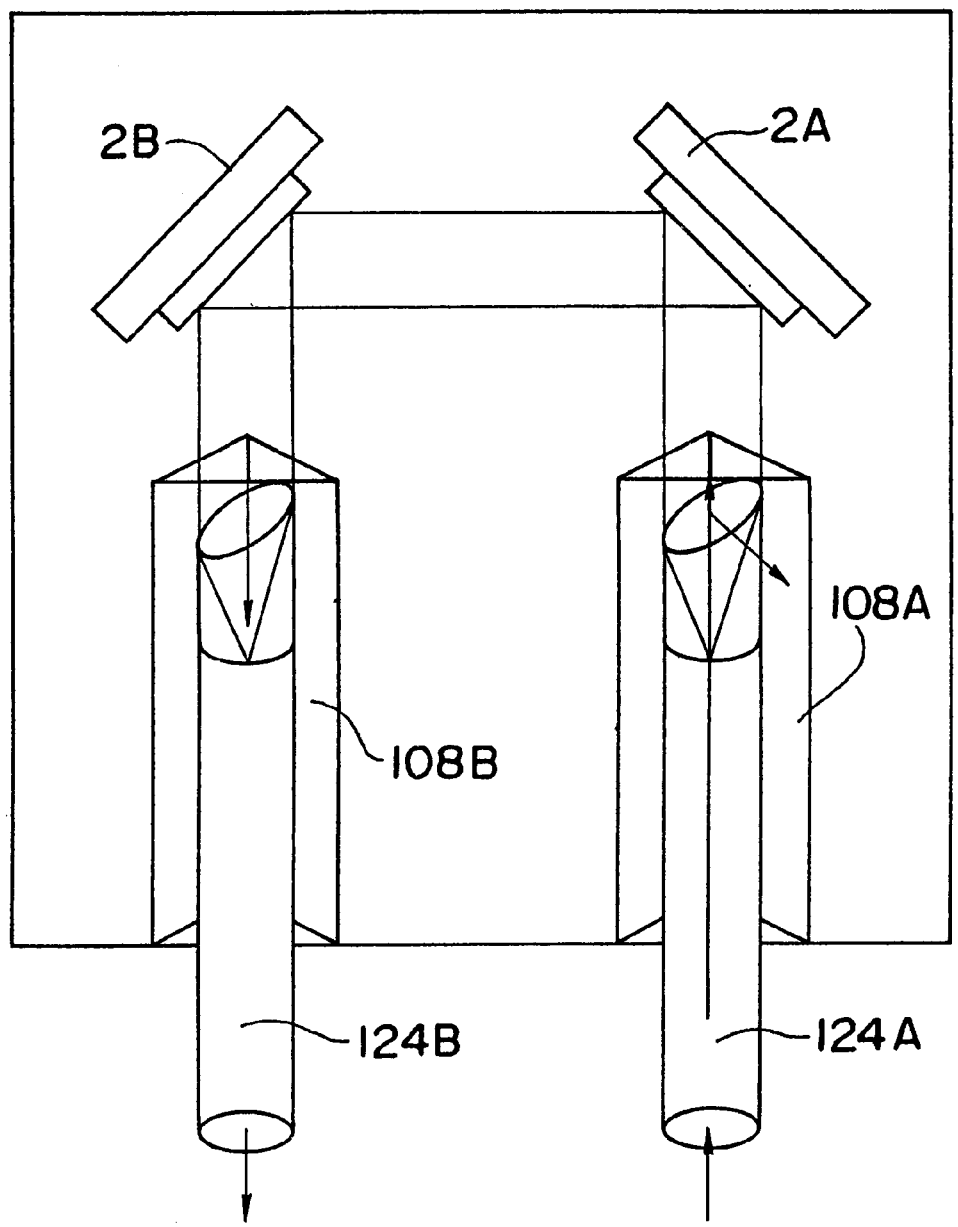
FIG. 18 is a plan view of another optical switching device.

FIG. 18 shows another optical switching device, which is similar to the device shown in FIG. 16. In this embodiment, each of the optical fibers 124A or 124B is provided at its end with a small collimator. The collimator is formed at its end with an angled surface so that light travelling in the collimator is reflected at its end toward the outside of the core portion. Thus, the amount of reflected light back into the optical fiber can be reduced.

There have been described in detail for certain preferred embodiments thereof, but it is to be understood that various modifications and improvements can be effected within the spirit and scope of the invention.

Figure 19A:
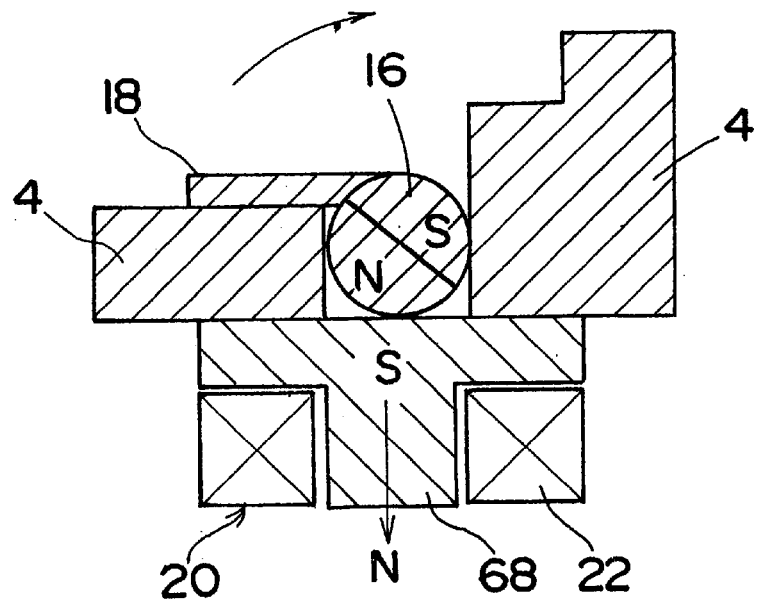
FIGS. 19A and 19B are cross sectional views of another optical switching device.
Figure 19B:
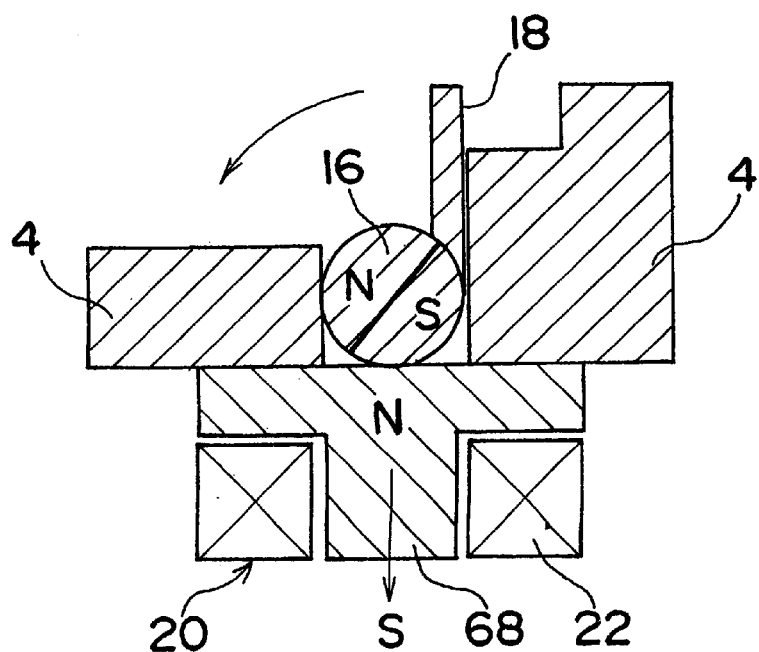
Figure 20:
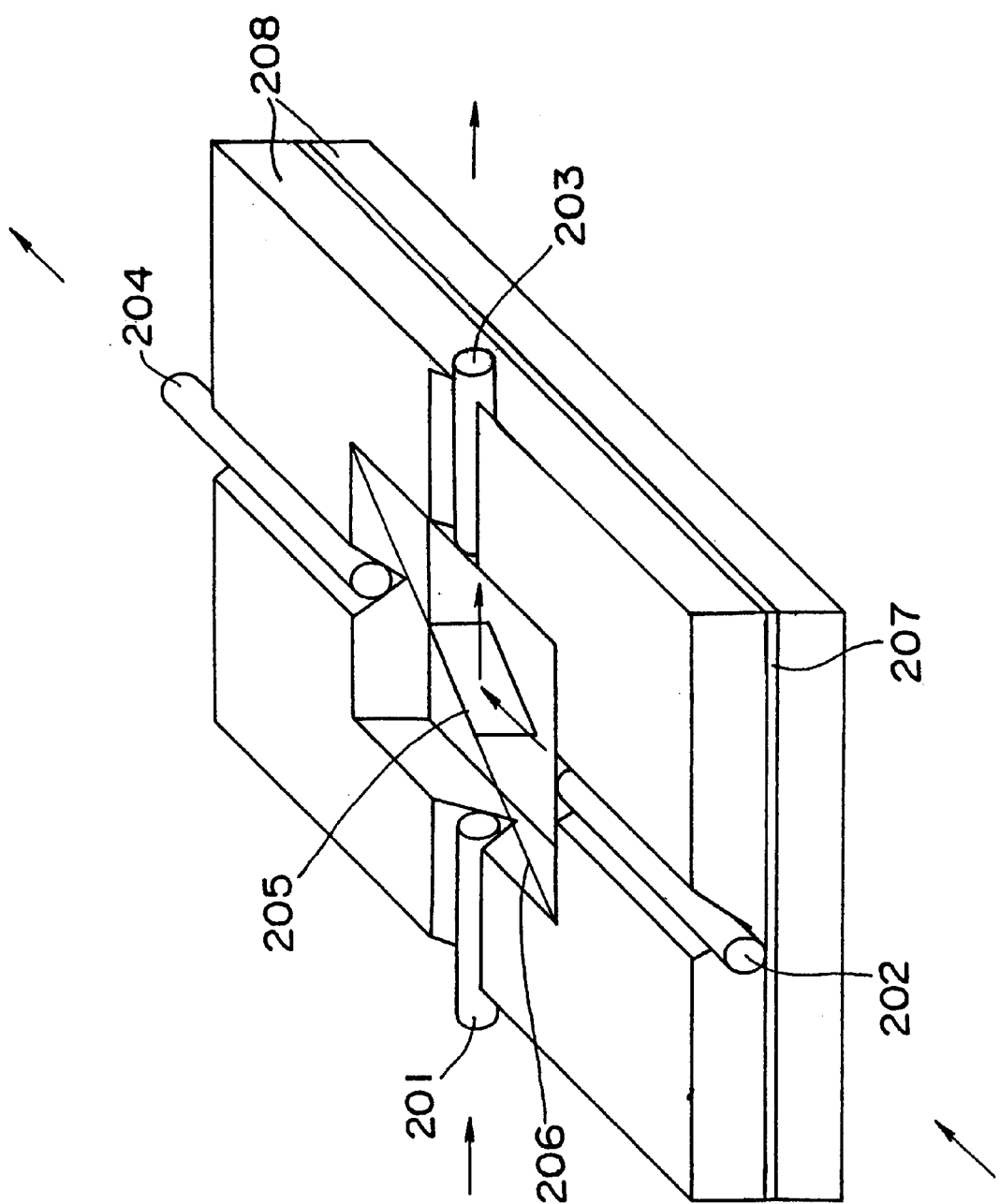
FIG. 20 is a perspective view of a prior art optical switching device.

For example, in the previous embodiments, the rectangular mirror 18 is fixed to the permanent magnet 16 so that it lies in a plane extending across the central axis of the permanent magnet 16. However, as shown in FIG. 19, the mirror 18 may be extended along a tangential line of the cylindrical permanent magnet 16 so that mirror 18 is held more stably in its vertical position.

Also, in the previous embodiments, the mirror 18 is rotated with the permanent magnet 16 by altering the magnetic field, but another arrangement that, for example, moves the mirror 18 between the first and second positions may be used instead.

Further, a prism may replace the mirror 18 for changing light paths.

Furthermore, in the previous embodiments, the direction of the electric current supplied to the electromagnetic device 20 is switched for altering the magnetic fields applied upon the permanent magnet 16 of the movable member 14. However, a slidable or rotatable permanent magnet may be used instead.

Moreover, although the permanent magnet 16 has only one N and S poles, it may have more N and/or S poles.

Instead of optical fiber, any light conducting means such as a waveguide may be used for the light emitter and the light receiver in the previous embodiments of the optical switching device.

Also, although in the previous embodiments V-grooved holding members 108 and 110 are provided for holding the optical fiber and lens in place, they may be replaced by holding members formed with grooves of another configuration such as U-shape or semi-circular.

Further, although in the previous embodiments, the mirror 18 is fixed to the permanent magnet 16, the movable member 14 may be replaced by a permanent magnet with its surface partially coated with a thin film of gold or aluminum for reflecting light.

Furthermore, although the permanent magnet 16 has a solid circular cross section, it may have a hollow cross section. Also, the cross sectional configuration of the permanent magnet 16 is not restrictive to the present invention.

Moreover, the supporting member 4 may be configured so that the mirror 18 can rotate at any desired angle, although the mirror is rotated at about 90 degrees in the previous embodiments.

Also, the number of the optical switching device is not restrictive to the present invention.

Further, although in the previous embodiments a magnetic force is used for holding the mirror 16, it may be replaced by another holding means.

Furthermore, although in the previous embodiments the non-contact type capacitance sensor (see FIG. 11) or the photo coupler (see FIG. 12) is used for detecting the position of the mirror 18, it may be replaced by another non-contact type detector such as ultrasonic sensor.

Moreover, although in the previous embodiments the cylindrical lens 106 is used for converging light, it may be replaced by another lens such as ball lens.

Also, the lens is positioned between the optical fiber and the mirror and between mirrors (see FIG. 13), it may be eliminated if they could be connected optically by the use of another suitable optical element.

Figure 21:
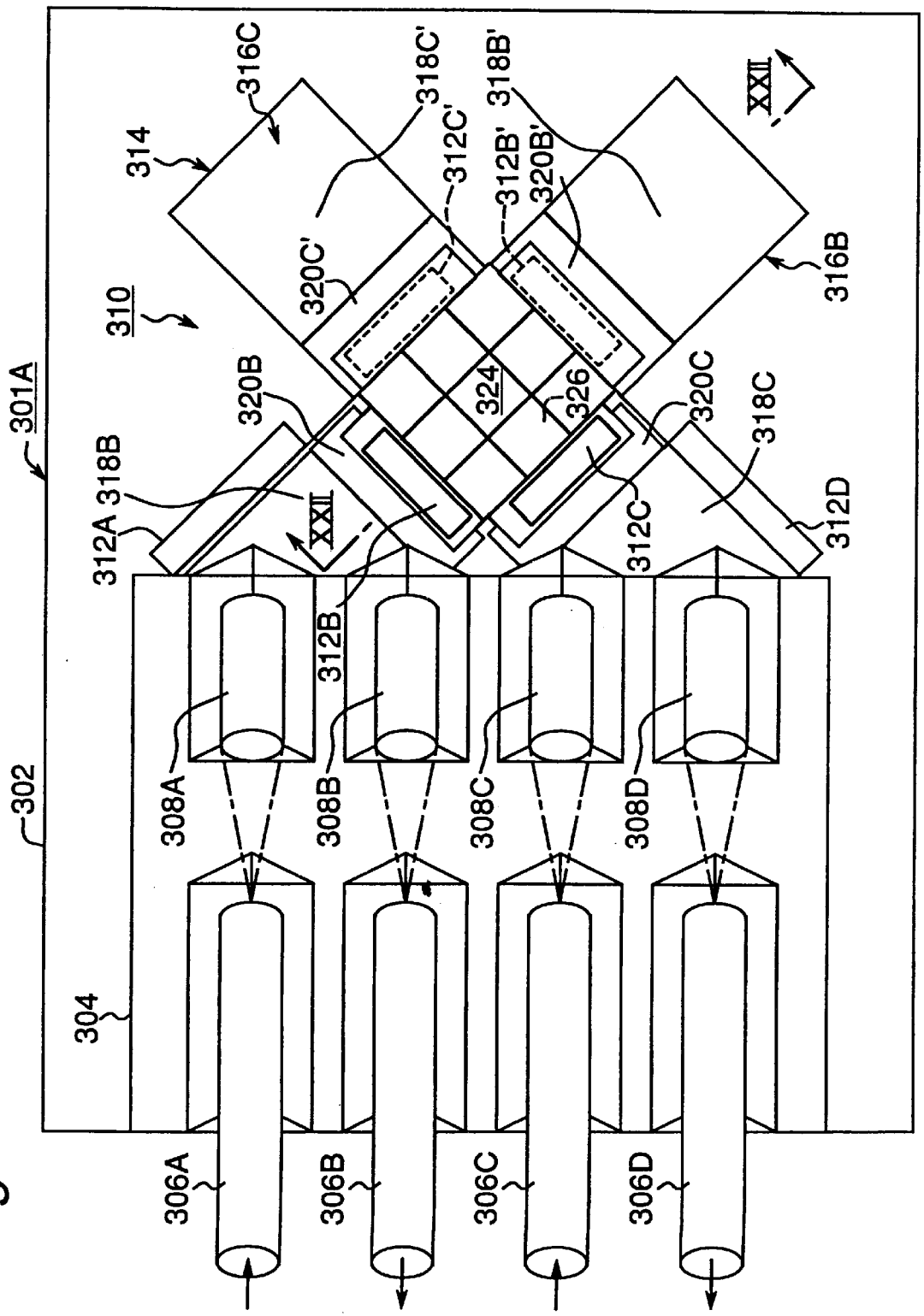
FIG. 21 is a plan view of another optical switching device of the present invention.
Figure 22:
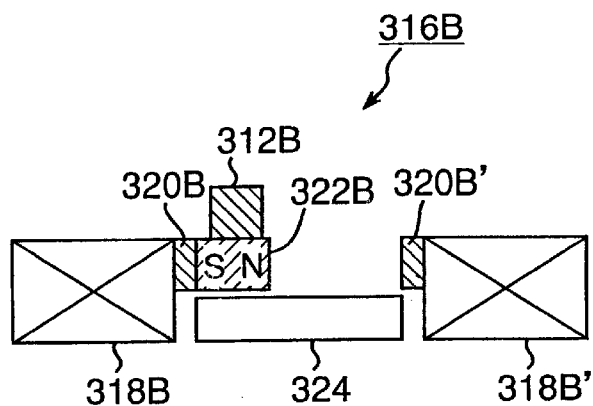
FIG. 22 is a cross sectional view of the device in FIG. 21, taken along lines XXII—XXII.

Referring now to FIGS. 21 and 22, an optical switching device is generally designated by numeral 301 and includes a substantially rectangular base 302. A substrate 304 is provided adjacent to one end side of the base 302. Four optical fibers 306A–306D (input optical fibers 306A and 306C, and output optical fibers 306B and 306C) are arranged in parallel at regular intervals on the substrate 304. The substrate 304 also supports lenses 308A–308D on one side of the optical fibers 306A–306D so that the lenses 308A–308D are coaxially located with the optical fibers 306A–306D, respectively. In addition, an optical switch 310 is provided on the right side (in FIG. 21) of the lenses 308A–308D.

Fixed reflectors 312A and 312D of the optical switch 310 are spaced from the lenses 308A and 308D on extended lines of longitudinal axis of the optical fibers 306A and 306D, respectively. The fixed reflectors 312A and 312D are inclined at +45 and −45 degrees, respectively, in the clockwise direction in FIG. 21 with respect to the optical fibers 306A and 306D, so that light emitted from the optical fiber 306A is reflected by the reflectors 312A and then 312D into the optical fiber 306D.

A movable reflector 312B is so arranged that it can move between a first position located on an extended line of longitudinal axis of the optical fiber 306B, indicated by a solid line and at numeral 312B and a second position located on an extended line of longitudinal axis of the optical fiber 306C, indicated by a dotted line and at numeral 312B'. A movable reflector 312C, on the other hand, is so arranged that it can move between a first position located on an extended line of longitudinal axis of the optical fiber 306C, is indicated by the solid line and at numeral 312C and a second position located on an extended line of longitudinal axis of the optical fiber 306B, indicated by the dotted line and at numeral 312C'.

The movable reflector 312B in the first position interposed between the fixed reflectors 312A and 312D inclines at −45 degrees in the clockwise direction to the optical fiber 306B so that light reflected by the fixed reflector 312A is conducted to the optical fiber 306B. On the other hand, the movable reflector 312C in the first position also interposed between the fixed reflectors 312A and 312D inclines at +45 degrees in the clockwise direction to the optical fiber 306C so that light emitted from the optical fiber 306C is conducted through the fixed reflector 312D to the optical fiber 306D.

Additionally, the movable reflectors 312B and 312C are so oriented in the second position that light emitted from the optical fiber 306C is reflected by the movable reflectors 312B and then 312C into the optical fiber 306B.

A mechanism 314 is provided for maintaining the movable reflectors 312B and 312C in the first or the second position, and for moving the reflectors 312B and 312C between the first and second positions. For this purpose, the mechanism 314 has the device 316B for biasing the movable reflector 312B from the first to the second position and vice versa, and the mechanism 314 also has the device 316C for biasing the movable reflector 312C from the first to the second position and vice versa.

The device 316B has first and second electromagnetic devices 318B and 318B'. The first electromagnetic device 318B is mounted beside the movable reflector 312B in the first position. The second electromagnetic device 318B' is mounted beside the movable reflector 312B in the second position. The first and second electromagnetic devices 318B and 318B' are provided with yokes 320B and 320B', respectively. The yokes 320B and 320B' are so positioned that one ends thereof are adjacent to the movable reflector 312B in the first and second positions, respectively. The movable reflector 312B is supported at its bottom on a permanent magnet 322B (see FIG. 22) capable of moving between the yokes 320B and 320B'. Also, the permanent magnet 322B is provided at its portions facing to the yokes 320B and 320B' with S and N poles, respectively.

In operation, when the movable reflector 312B and the permanent magnet 322B are in the respective first positions, the permanent magnet 322B attracts one end of the yoke 320B, which positively holds the movable reflector 312B in the first position. When the first electromagnetic device 318B is then energized so that one end of the yoke 320B opposing to the permanent magnet 322B is magnetized into S pole, the S poles of the yoke 320B and the permanent magnet 322B repel each other, which moves the movable reflector 312B and the permanent magnet 322B to the respective second positions. On the other hand, where the movable reflector 312B and the permanent magnet 322B take the second positions and the second electromagnetic device 318B' in this state is energized so that the one end of the yoke 320B' opposing to the permanent magnet 322B is magnetized into N pole, the N poles of the yoke 320B' and the permanent magnet 322B repel each other, which moves the movable reflector 312B and the permanent magnet 322B to the first position.

Likewise, the device 316C has first and second electromagnetic devices 318C and 318C'. The first electromagnetic device 318C is mounted beside the movable reflector 312C in the first position. The second electromagnetic device 318C' is mounted beside the movable reflector 312C in the second position. The first and second electromagnetic devices 318C and 318C' are provided with yokes 320C and 320C', respectively. The yokes 320C and 320C' are so positioned that one ends thereof are adjacent to the movable reflector 312C in the first and second positions, respectively. The movable reflector 312C is supported at its bottom on a permanent magnet 322C capable of moving between the yokes 320C and 320C'. Also, the permanent magnet 322C is provided at its portions facing the yokes 320C and 320C' with S and N poles, respectively.

In operation, when the movable reflector 312C and the permanent magnet 322C are in the respective first positions, the permanent magnet 322C attracts one end of the yoke 320C, which positively holds the movable reflector 312C in the first position. When the first electromagnetic device 318C is then energized so that the one end of the yoke 320C opposing to the permanent magnet 322C is magnetized into S pole, the S poles of the yoke 320C and the permanent magnet 322C repel each other, which moves the movable reflector 312C and the permanent magnet 322C to the respective second positions. On the other hand, where the movable reflector 312C and the permanent magnet 322C take the second positions and in this state the second electromagnetic device 318C' in this state is energized so that the one end of the yoke 320C' opposing to the permanent magnet 322C is magnetized into N pole, the N poles of the yoke 320C' and the permanent magnet 322C repel each other, which moves the movable reflector 312C and the permanent magnet 322C to the first position.

An electromagnetic linear actuator 324 is provided in a region in which the movable reflectors 312B and 312C move back and forth and is surrounded by the movable reflectors 312B and 312C in the first position and the movable reflectors 312B' and 312C' in the second position. Using a floating technique employed in linear-motor cars, the electromagnetic actuator 324 allows the movable reflectors 312B and 312C to move between the first and second positions with minimum resistance.

The electromagnetic actuator 324 includes $N^2$ electromagnetic coils 326 arranged in an N×N matrix with its rows or columns along the moving direction of the movable reflectors 312B and 312C. Each of the electromagnetic coils 326 is also connected to an associated power supply (not shown) so that it can be controlled independently and be supplied with electric current in either direction. More specifically, assuming the case of the electromagnetic actuator 324 in which the magnetic coils are arranged in a 3×3 matrix, when the movable reflector 312B is moved from the first to the second position, electric current is fed first to the first row of the electromagnetic coils in the vicinity of the movable reflector 312B in the first position, then to the second row, and finally to the third row so that a magnetic field travels toward the second position and thereby biases the permanent magnet 322B thereto. When the movable reflector 312B is moved, on the other hand, from the second to the first position, the magnetic field travels toward the first position and thereby biases the permanent magnet 322B thereto.

Likewise, when the movable reflector 312C is moved from the first to the second position, electric current is fed first to the first column of the electromagnetic coils in the vicinity of the movable reflector 312C in the first position, then to the second column, and finally to the third column so that a magnetic field travels toward the second position and thereby biases the permanent magnet 322C thereto. When the movable reflector 312C is moved, on the other hand, from the second to the first position, the magnetic field travels toward the first position and thereby biases the permanent magnet 322C thereto. Accordingly, the movable reflectors 312B and 312C can be moved between the first and second positions with smaller frictional resistance.

An operation of the optical switching device 301 will now be described in detail hereinafter. When the movable reflectors 312B and 312C are in the first position, light emitted from the optical fiber 306A is collimated through the lens 308A, reflected by the reflectors 312A and then 312B, converged by the lens 308B, and finally conducted into the optical fiber 306B. Also, light emitted from the optical fiber 306C is collimated through the lens 308C, reflected by the reflectors 312C and then 312D, converged by the lens 308D, and finally conducted into the optical fiber 306D.

When the movable reflectors 312B and 312C are next moved from the first to the second position, the electromagnetic devices 318B and 318C of the device 316B and 316C are energized to bias the permanent magnets 322B and 322C toward the respective second position, and then eliminate the magnetic attraction between the permanent magnets 322B and 322C and the yokes 320B and 320C. Then, electric current is fed to the electromagnetic coils 326 of the electromagnetic actuator 324 as mentioned above, which generates the magnetic field to floatingly move the movable reflectors 312B and 312C, together with the permanent magnet 322B and 322C, to the second position with minimum resistance.

When the movable reflectors 312B and 312C are in the second position, light emitted from the optical fiber 306A is collimated through the lens 308A, reflected by the reflectors 312A and then 312D, converged by the lens 308D, and finally conducted into the optical fiber 306D. Also, light emitted from the optical fiber 306C is collimated through the lens 308C, reflected by the reflectors 312B and then 312C, converged by the lens 308B, and finally conducted into the optical fiber 306B.

When the movable reflectors 312B and 312C are next moved from the second to the first position, the electromagnetic devices 318B' and 318C' of the devices 316B and 316C are energized to bias the permanent magnets 322B and 322C toward the respective first position, and then eliminate the magnetic attraction between the permanent magnets 322B and 322C and the yokes 320B' and 320C'. Then, electric current is fed to the electromagnetic coils 326 of the electromagnetic actuator 324 as mentioned above, which generates the magnetic field to floatingly move the movable reflectors 312B and 312C, together with the permanent magnet 322B and 322C, to the first position with minimum resistance.

In viewing above, according to the optical switching device 301, the movable reflectors 312B and 312C can be held stably in the first and second positions.

Also, as can be seen from FIG. 21, the movable reflectors 312B and 312C share the common movable region and, therefore, they would collide with each other when they were moved simultaneously. To avoid this, it is necessary to complete the movement of one movable reflector before moving the other movable reflector.

Figures 23A, 23B, 23C:
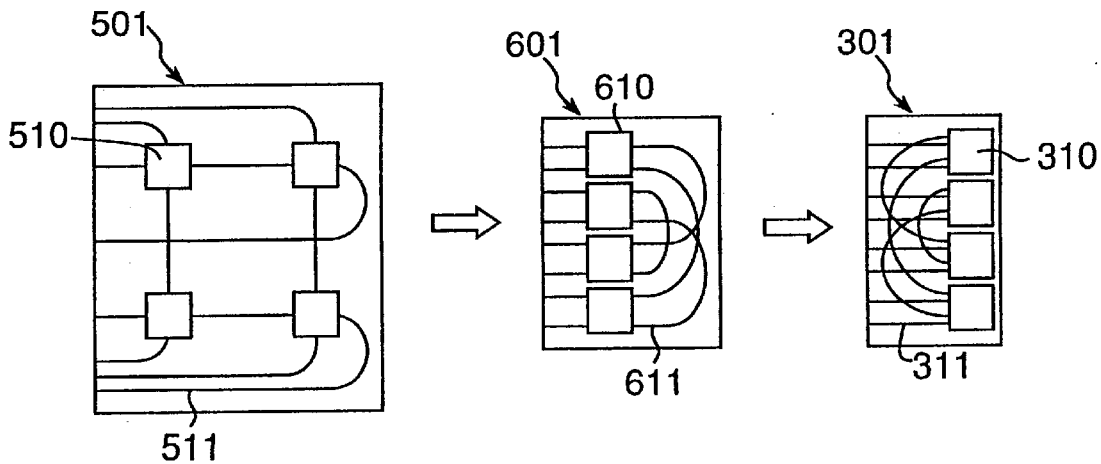
FIGS. 23A and 23B show spaces required for mounting prior art optical switching device.
FIG. 23C is a plan view illustrating a space for mounting the optical switching device of the present invention.

Referring now to FIGS. 23A to 23C, the mounting area of the optical switching device 301 of the present invention is compared with those of optical switching device 501 and 601 having different structures. More specifically, the device 501 shown in FIG. 23A include four optical switches 510 each having four optical fibers 511 extending outwardly in four directions. In this instance, to connect the four optical switches 510 through the optical fibers 511 and to extend these optical fibers 511 in the direction shown, a relatively large mounting space is needed because the optical fibers 511 should be curved without being damaged. As shown in FIG. 23B, the device 601 in which each of four optical switches 610 has optical fibers 611 extending out in opposite directions needs a mounting area smaller but still larger than that required for the switching device 501. In contrast, all optical fibers 311 of the device 301 in the prior embodiment can extend out on one end side of the optical switch 310, which considerably reduces its the mounting area.

In this embodiment, as shown in FIG. 21, the input optical fiber 306A, the output optical fiber 306B, the input optical fiber 306C, and the output optical fiber 306D are situated in this order on one side of the base 302, however, this is not restrictive to the present invention.

Also, each of the two movable reflectors is moved in directions angled at +45 or −45 degrees in the clockwise direction to the optical fibers. They may be directed parallel or perpendicular to the optical fibers. The input and the output optical fibers may be disposed as indicated by examples shown in FIG. 24, in which "I" and "O" indicate input and output optical fibers, respectively.

The arrangement of the reflectors is not restrictive to the present invention. For example, in FIG. 25A, four reflectors 312A–312D in the first state (FIG. 25A1) are spaced a fixed distance from corresponding optical fibers. In the second state (FIG. 25A2), the two intermediate reflectors 312B and 312C are positioned from outside a region between the side reflectors 312A and 312D, away from the optical fibers. The mechanism used for moving the reflectors 312B and 312C described in the above-mentioned mechanism is not restrictive to the present invention, and it may be modified in different ways so that, for example, it has another mechanism that allows each of the reflectors to rotate at 90 degrees about its end.

According to the arrangement shown in FIG. 25B, in the first state (FIG. 25B1) the two reflectors 312A and 312C are positioned closer to the optical fibers than the remaining reflectors 312B and 312D. The first state can be changed into the second state (see FIG. 25B2 and B2') simply by moving the reflectors. The second state shown in FIG. 25B2 is created by moving the reflectors 312C and 312D in a direction parallel to or perpendicular to the optical fibers. Another second state showed in FIG. 25B2' is created by moving the reflectors 312A and 312B in a direction parallel to or perpendicular to the optical fibers.

According to the arrangement of FIG. 25C, in the first state (FIG. 25C1) the two reflectors 312A and 312B are positioned closer to the optical fibers than the remaining reflectors 312C and 312D. The second state shown in FIG. 25C2 is created by rotating the reflectors 312B and 312C or moving them perpendicular to the optical fibers.

Figure 26:
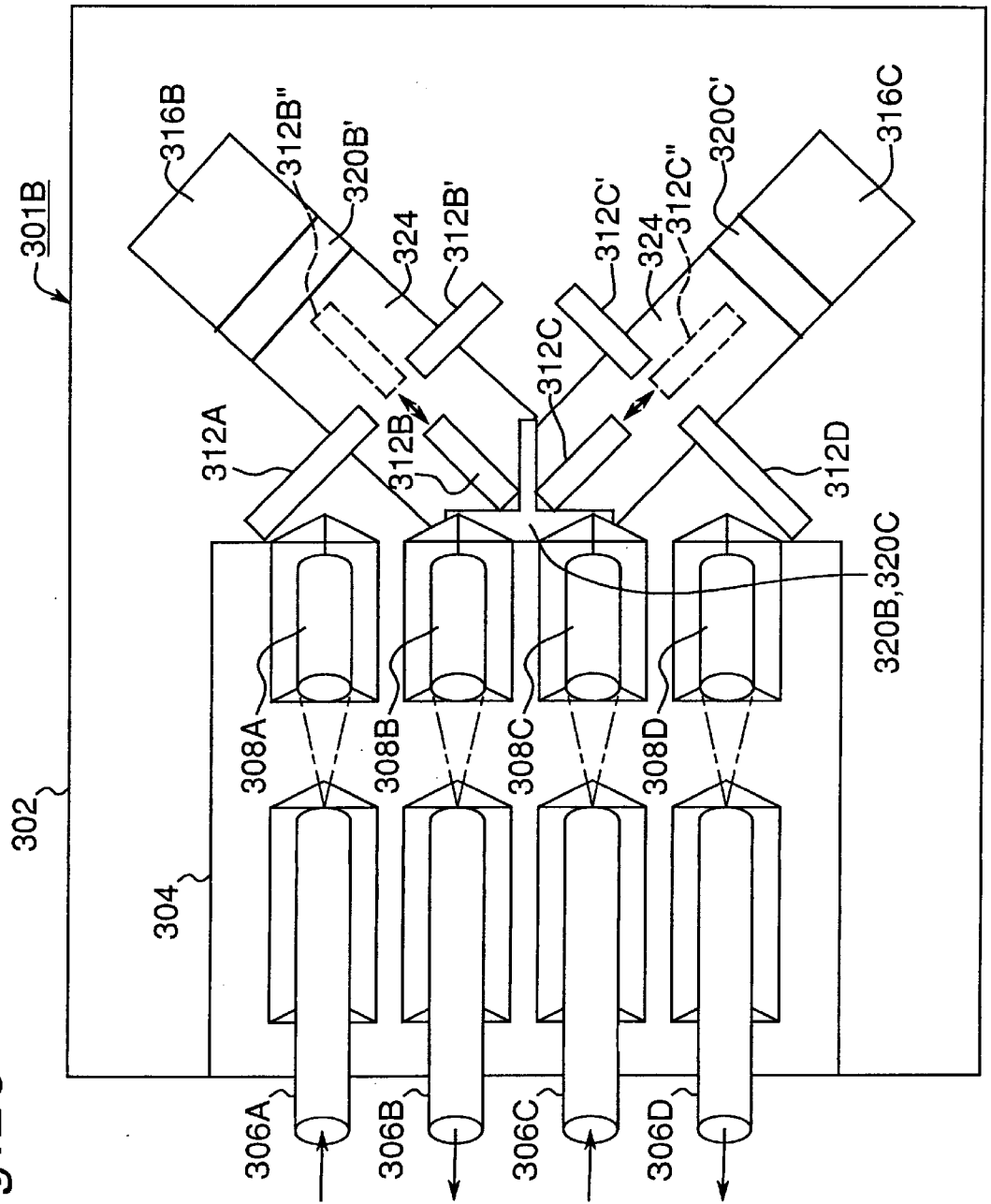
FIG. 26 is a plan view of another optical switching device of the present invention.

FIG. 26 shows another optical switching device. The device 301B includes fixed reflectors 312A, 312B', 312C', and 312D located on respective extended lines of longitudinal axes of the optical fibers 306A, 306B, 306C, and 306D. The fixed reflectors 312A, 312B', 312C', and 312D are oriented and positioned so that light emitted from the optical fiber 306A is reflected by the fixed reflectors 312A and then 312D into the optical fiber 306D, and light emitted from the optical fiber 306C is reflected by the fixed reflectors 312C' and then 312B' into the optical fiber 306B. The optical switching device 301B also includes two movable reflectors 312B and 312C. The movable reflector 312B is permitted to move between first and second positions through fixed reflectors 312A and 312B'. In the first position, the movable reflector 312B is located on an extended line of longitudinal axis of the optical fiber 306B, indicated at numeral 312B, where it receives light reflected by the fixed reflector 312A and guides it into the optical fiber 306B. In the second position, the movable reflector 312B is located out of the extended line, indicated at numeral 312B". Another movable reflector 312C is permitted to move between first and second positions through fixed reflectors 312D and 312C'. In the first position, the movable reflector 312C is located on an extended line of longitudinal axis of the optical fiber 306C, where it receives light from the optical fiber 306C and guides it through the fixed reflector 312D into the optical fiber 306D. In the second position, the movable reflector 312C is located out of the extended line, indicated at numeral 312C". The mechanism and electromagnetic actuator described in the prior embodiment may be used for moving the movable reflectors 312B and 312C.

With the arrangement, unlike the prior embodiment, the movable reflectors 312B and 312C do not collide with each other even when they could be moved simultaneously. This reduces an optical-path switching time, which results in a quick response optical switch. Additionally, when the movable reflectors 312B and 312C are out of extended line of the optical fibers, light is guided by the use of the fixed reflectors, which results in a precise optical-path switching operation.

Figure 27:
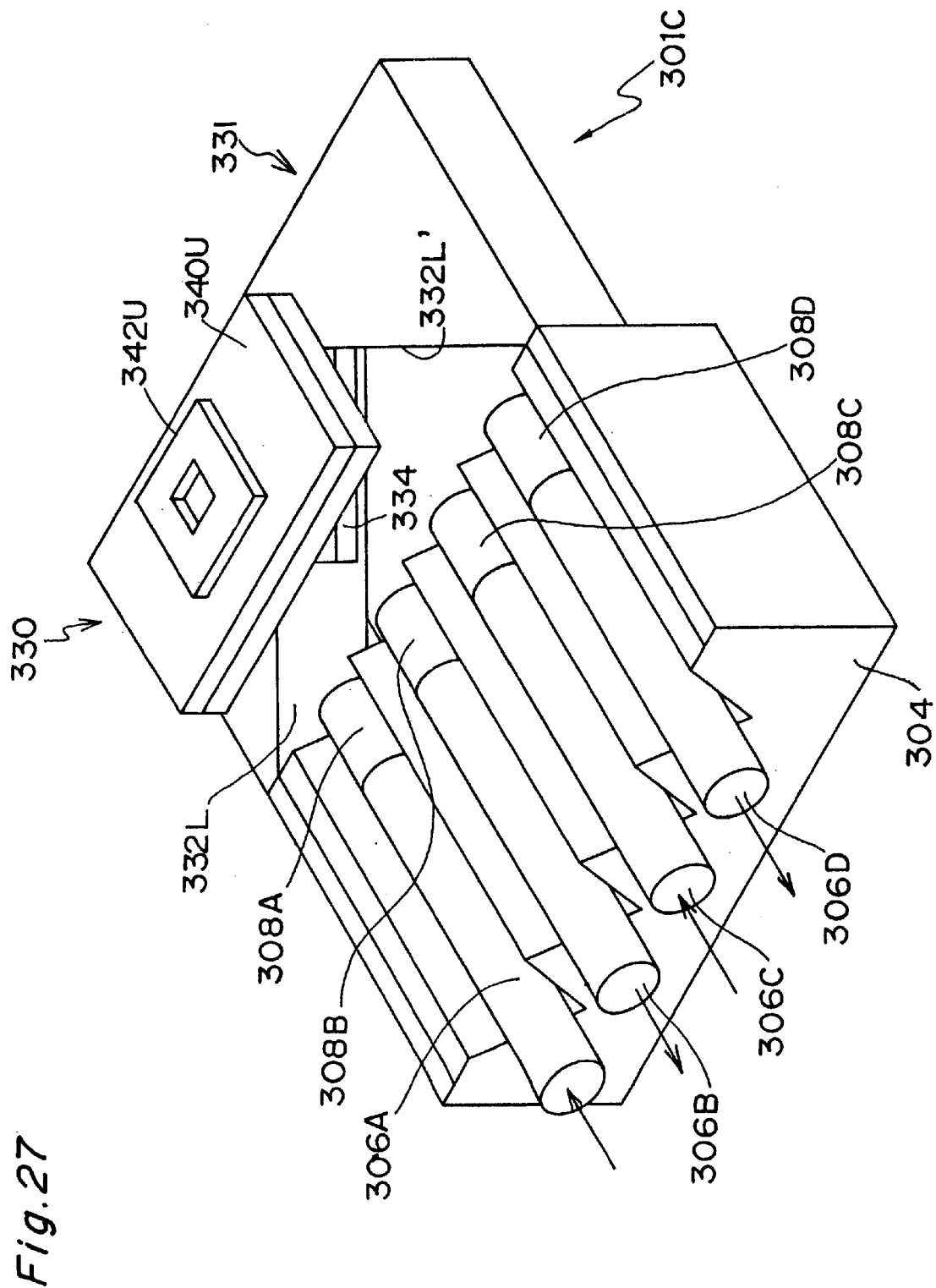
FIG. 27 is a perspective view of another optical switching device of the present invention.
Figure 28A:
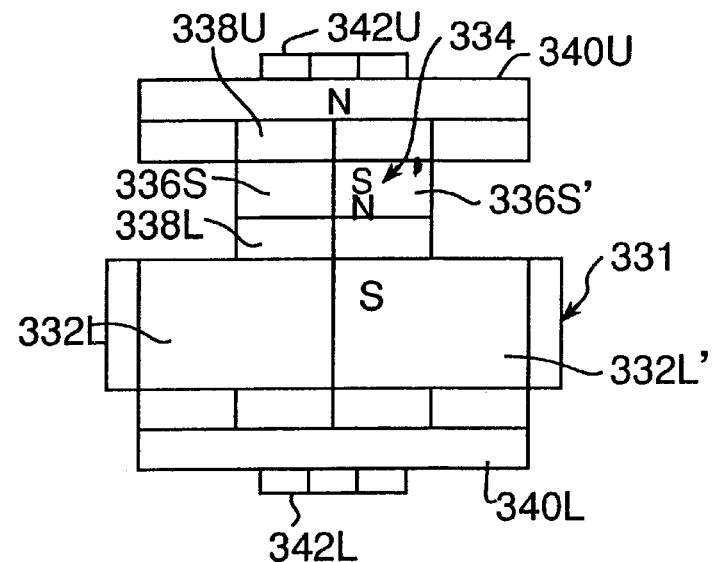
FIGS. 28A and 28B show a movement of a movable block in the optical switching device in FIG. 27.
Figure 28B:
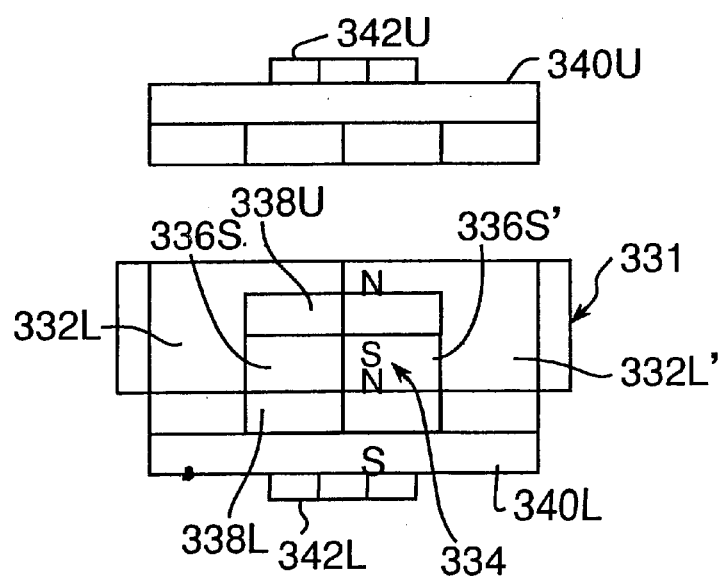

FIGS. 27, 28A and 28B show another optical switching device, generally indicated by reference numeral 301C. The device 301C includes a fixed block 331 having a pair of larger reflective surfaces 332L and 332L'. The reflective surfaces 332L and 332L' are positioned on extended lines of optical fibers 306A, 306B, 306C and 306D, respectively, and inclined thereto at 45 degrees in opposite directions so that, for example, light from the optical fibers 306A and 306C are reflected at the fixed reflective surfaces 332L and 332L' and then 332L' and 332L into symmetrically arranged optical fibers 306D and 306B, respectively.

The optical switch 330 also includes a movable block 334. The movable block 334, which has a square configuration when viewed from its upward or downward position, is positioned at a corner of the larger reflective surfaces 332L and 332L' with its neighboring vertical surfaces adjacent to the reflective surfaces 332L and 332L', respectively. In addition, the movable block 334 is supported so that it can move vertically between a first position where small neighboring reflective surfaces 336S and 336S' are out of extended lines of the optical fibers 306B and 306C (see FIG. 28A) and a second position where they are located on the extended lines of the optical fibers 306B and 306C, respectively (see FIG. 28B).

To move the movable block 334, permanent magnets 338U and 338L are mounted on top and bottom portions of the block 334, respectively. The permanent magnets 338U and 338L each have N pole at its top and S pole at its bottom. An upper stop 340U made of magnetic material is provided on the top of the fixed block 331 for retaining the movable block 334 in the first position. A lower stop 340L also made of magnetic material is provided on the bottom of the fixed block 331 for retaining the movable block 334 in the second position. Electromagnetic devices 342U and 342L provided adjacent to the stopping plates 340U and 340L, respectively, are magnetically connected to the stops 340U and 340L, respectively. This allows that, when electric current is fed to the electromagnetic devices 342U and 342L, a resultant magnetic field extends upon the stopping plates 340U and 340L.

With the optical switching device 301C, when the movable block 334 is in the first position (see FIG. 28A), the permanent magnet 338U attracts the upper stopping plate 340U to hold the movable block 334 its first position. In this state, light emitted from the optical fiber 306A is reflected by the reflective surfaces 332L and then 332L' of the fixed block 331 into the optical fiber 306D. Also, light emitted from the optical fiber 306C is reflected by the reflective surfaces 332L' and then 332L of the fixed block 331 into the optical fiber 306B.

To move the movable block 334 from the first to the second position, the electromagnetic device 342U is energized to magnetize the bottom of the upper stopping plate 340U with N pole. As a result, the upper stopping plate 340U and the permanent magnet 338U repel each other, and the movable block 334 is moved downwardly to the second position.

When the movable block is in the second position (see FIG. 28B), the permanent magnet 338L attracts the lower stop 340L to hold the movable block 334 in its second position. In this state, light emitted from the optical fiber 306A is reflected by the reflective surface 332L of the fixed block 331 and then the reflective surface 336S of the movable block 334 into the optical fiber 306B. Also, light emitted from the optical fiber 306C is reflected by the reflective surfaces 336S' of the movable block 334 and then the reflective surface 332L' of the fixed block 331 and is finally conducted to the optical fiber 306D.

To move the movable block 334 from the second to the first position, the electromagnetic device 342L is energized to magnetize the top of the lower stopping plate 340L with S pole. As a result, the lower stopping plate 340L and the permanent magnet 338L repel each other, and the movable block 334 is moved upwardly to the first position.

With the optical switching device 301C, the optical path is quickly changed by the movement of the movable block 334. Also, the reflective surfaces of the blocks are oriented in the fixed direction, which ensures that light is reflected to the required direction.

Further, although the magnetic force is used for moving the movable block 334, another moving mechanism may be used instead.

Figure 29:
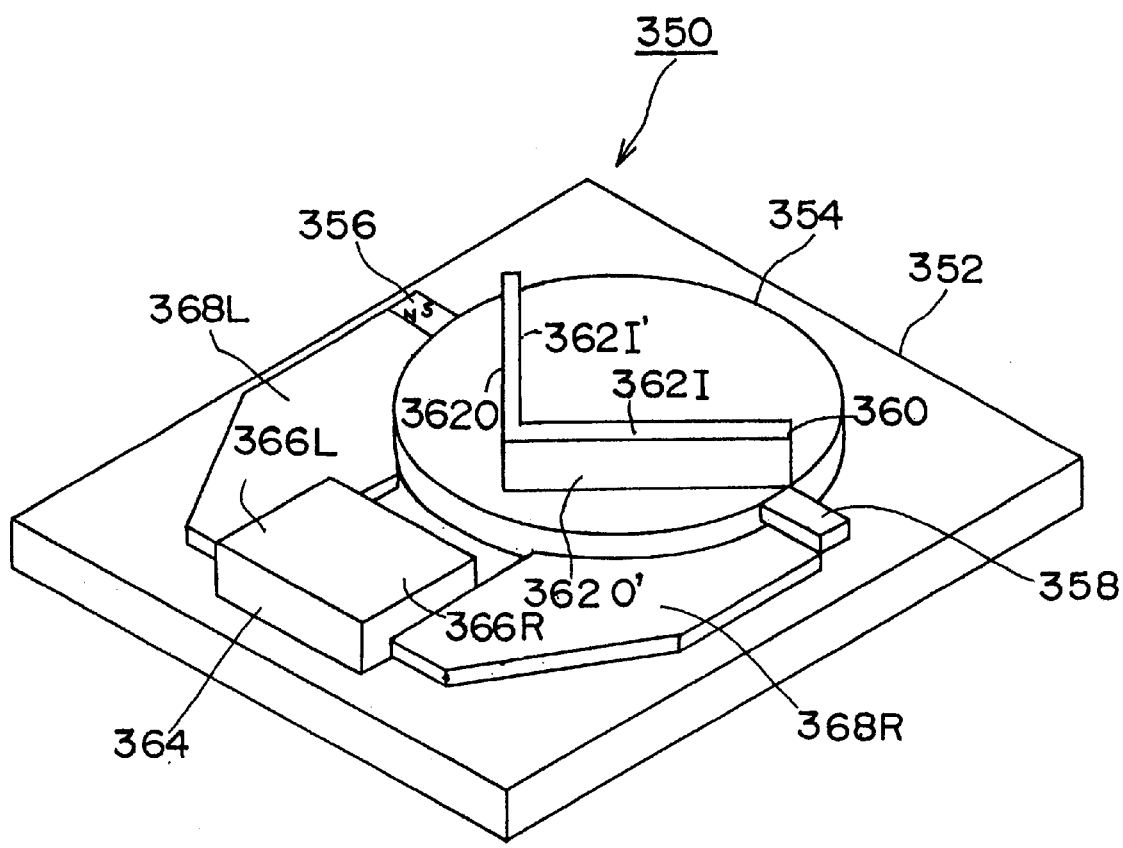
FIG. 29 is a perspective view of another optical switch of the present invention.
Figure 30B:
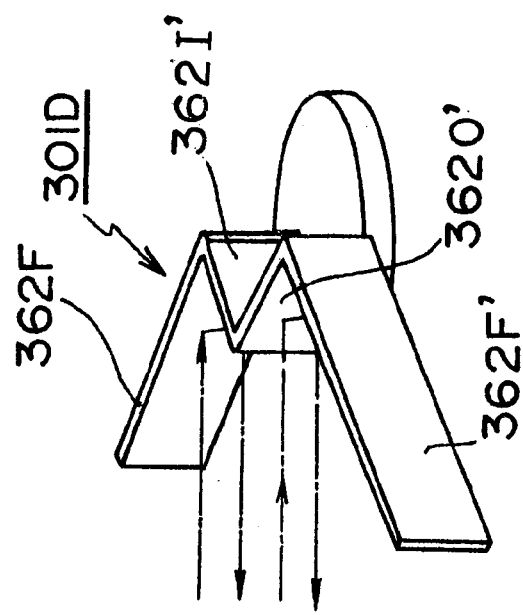
FIGS. 30A and 30B show the movement of the reflecting member shown in FIG. 29 between the first and second positions.
Figure 30A:
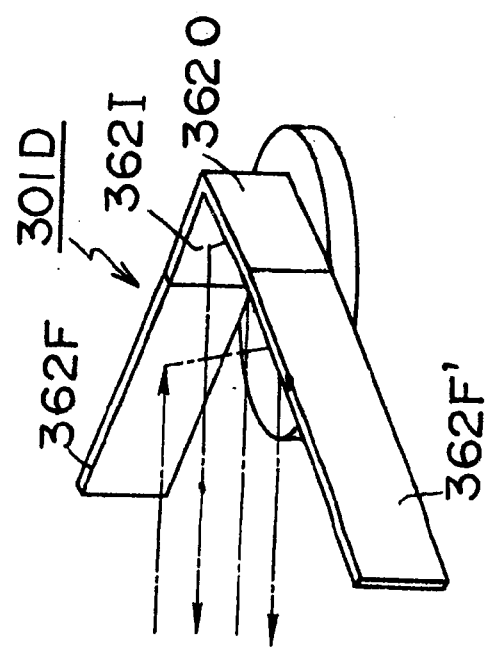
Figure 31:
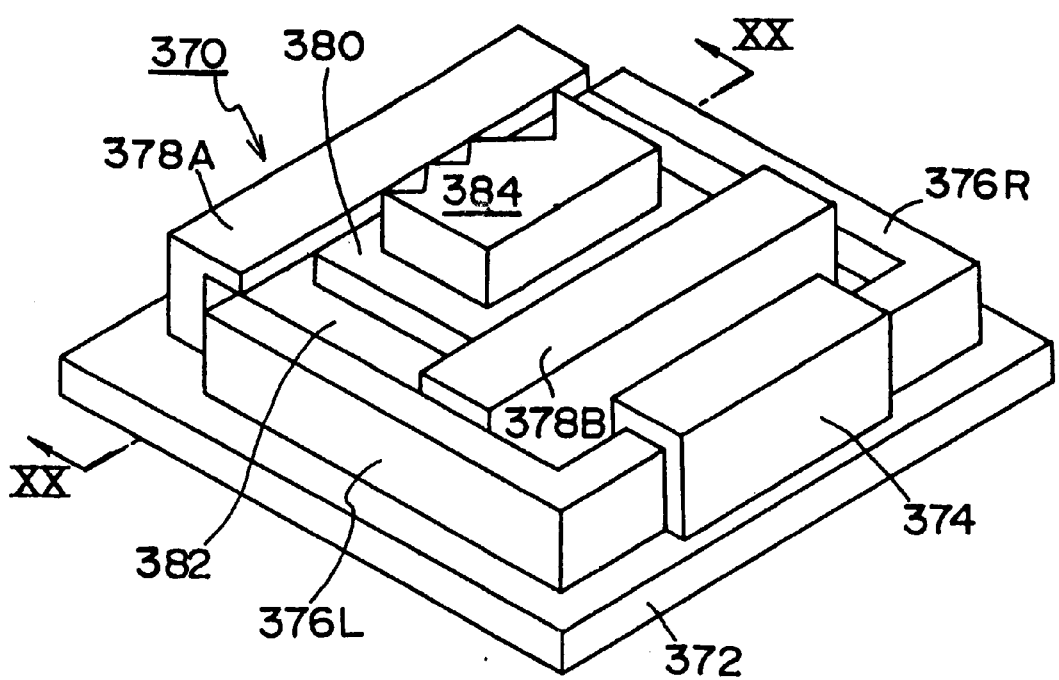
FIG. 31 is a perspective view of another optical switch of the present invention.
Figure 32:
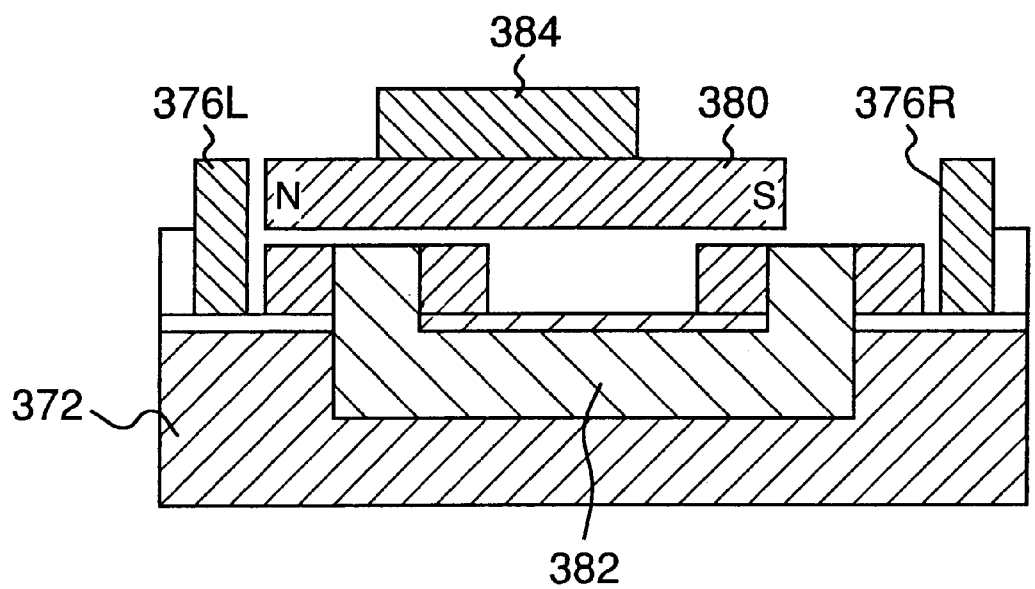
FIG. 32 is a cross sectional view of the switch in FIG. 31 taken along line XXXII—XXXII.

FIGS. 29, 30A, and 30B show another optical switch 350 of the optical switching device in accordance with the present invention. The optical switch 350 has a base 352 on which a disk 354 is rotatably supported. The disk 354 is operatively connected at its center to a motor (not shown), so that it can be rotated in opposite directions. The disk 354 is provided at its opposite sides with a permanent magnet 356 having a certain weight and a counterbalance 358 having the same weight as the permanent magnet 356. The permanent magnet 356 is magnetized at its opposite sides with respect to a rotational direction of the disk 354 with N and S poles. In addition, the permanent magnet 356 is positioned at a lower portion of a peripheral surface of the disk and the counterbalance 358 at an upper portion thereof. The disk 354 is provided at its top with a L-shaped reflective member 360 which has neighboring inner reflective surfaces 362I and 362I' and neighboring outer reflective surfaces 362O and 362O'.

Also mounted on the base 352 is an electromagnetic device 364 which includes opposite portions 366L and 366R to be magnetized when the electromagnetic device 364 is energized. Yokes 368L and 368R each extend from the portions 366L and 366R around the disk 354 and terminate at opposite sides of the disk 354. It should be noted that a thickness or a top level of each of the yokes 368L and 368R is limited so that it allows the counterbalance 358 to pass over the yokes 368L and 368R without any interference therewith and the permanent magnet 356 to make contact at its opposite sides with the corresponding yokes 368L and 368R.

Accordingly, as shown in FIG. 29 when the permanent magnet 356 is in the first position where it is in engagement with the yoke 368L, the disk 354 is retained in place by the attractive magnetic force between the permanent magnet 356 and the yoke 368L. Then, the electromagnetic device 364 is energized so that the yokes 368L and 368R are magnetized into N and S poles, respectively. This results in a repellant magnetic force between the yoke 368L and the permanent magnet 356, which causes the permanent magnet 356 to move away from the yoke 368L. Subsequently, the disk 354 is rotated by the motor not shown in the clockwise direction until the permanent magnet 356 would make a contact with the yoke 368R. Since the yokes 368L and 368R are positioned lower than the counterbalance 358 as mentioned above, they do not interfere with each other at the rotation of the disk 354. Accordingly, the L-shaped reflecting member 360 set to the second position where it is half turned, i.e., tuned at 180 degrees, from the first position shown in FIG. 29.

In the second position, due to the attractive magnetic force between the permanent magnet 356 and the yoke 368R, the disk 354 is positively retained in place. Again, when the electromagnetic device 364 is energized so that the yokes 368L and 368R are magnetized into N and S poles, respectively, the permanent magnet 356 is rotated away from the yoke 368R due to the repellant magnetic force generated between the yoke 368R and the permanent magnet 356. This allows the motor to rotate the disk 354 in the counterclockwise direction until the permanent magnet 356 would return to the first position where it makes contact with the yoke 368L.

In view of above, with the optical switch 350 so constructed, the light path is changed by the rotation of the reflective member 360, which allows the optical switch 350 to have a quick response. Also, the reflective surfaces of the reflective member can correctly be directed to the required direction, which results in a precise optical path change.

As shown in FIGS. 30A and 30B, the optical switch 350 further includes two fixed reflecting members (reflective surfaces) 362F and 362F'. The fixed reflecting members 362F and 362F' are positioned on opposite sides of the disk 354 so that, when the reflective member 360 takes the second position as shown in FIG. 30A, they form a large L-shaped reflecting wall with the inner surfaces 362I and 362I' of the reflective member 360 and, when the reflective member takes the first position as shown in FIG. 30B, they form a W-shaped reflecting wall with the outer surfaces 362O and 362O' of the reflective member 360. The fixed reflecting members 362F and 362F' have reflective surfaces 362F and 362F', respectively, to cooperate with the reflective surfaces of the reflective member 360, forming the reflective L-shaped and W-shaped reflective wall. It is to be noted that, when the disk 354 takes the first position shown in FIG. 30B, the fixed reflective surfaces 362F and 362F' define right angles with the neighboring reflective surfaces 362I and 362I', respectively.

Accordingly, when the disk 354 takes the first position shown in FIG. 30B, one light entering the fixed reflective surface 362F from one direction is oriented toward the neighboring reflective surface 362O where it is again oriented to the opposite direction. Likewise, another light entering the reflective surface 362O' from one direction is oriented toward the neighboring reflective surface 362F' where it is oriented to the opposite direction. When the disk 354 takes the second position shown in FIG. 30A, one light entering the fixed reflective surface 362F is reflected toward the other fixed reflective surface 362F' where it is directed to the opposite direction. Likewise, another light entering the reflective surface 362I' is reflected toward the neighboring reflective surface 362I where it is directed to the opposite direction.

FIGS. 31, 32, 33A and 33B show another optical switch 370 in accordance with the present invention. The optical switch 370 has a base 372 on which an electromagnetic device 374 and a pair of yokes 376L and 376R are mounted. The yokes 376L and 376R extend substantially in a parallel fashion from the respective opposite end portions of the electromagnetic device 374 where they would be magnetized when the electromagnetic device 374 is energized. Provided between the yokes 376L and 376R is a pair of parallel guides 378A and 378B extending perpendicular to the yokes 376L and 376R. A permanent magnet 380 is mounted between the guides 378A and 378B so that it is guided by the guides to move back and forth between the opposing yokes 376L and 376R. The permanent magnets 380 has magnetic poles, i.e., N and S poles, at its portions opposing to the yokes 376L and 376R, respectively. An electromagnetic linear actuator 382 of the type described above underlies the permanent magnet 380 to generate a transitional magnetic field for biasing the permanent magnet 380 from one yoke 376L to the other yoke 376R and vice versa. A substantially rectangular reflector or block 384 is secured on the permanent magnet 380.

Referring to FIG. 33, the reflector 384 is formed in its one side surface confronting to the guide 378 with a reflective surface portion. The reflective surface portion includes two large neighboring reflective surfaces 386A and 386B which defines a right angle therebetween. Also, the reflective surface has four small neighboring reflective surfaces 388A, 388B, 388C and 388D arranged in a zigzag fashion so that each of neighboring two reflective surfaces cooperate to define a right angle therebetween.

With the optical switch 370, when the permanent magnet 380 is adjacent to one yoke 376R, the permanent magnet 380 and the reflector 384 are retained in the first position by the attractive magnetic force generated between the permanent magnet 380 and the yoke 376R. Then, when the electromagnetic device 374 is energized so that the yokes 376L and 376R are magnetized into N and S poles, respectively, the permanent magnet 380 is forced toward the opposite yoke 376L by the repellant magnetic force between the yoke 376R and the permanent magnet 380. In this state, by energizing the electromagnetic actuator 382 located under the permanent magnet 380, the permanent magnet 380 as well as the reflecting block 384 is moved toward the opposite yoke 376L into the second position. It is to be noted that the electromagnetic device 374 is turned off immediately after the permanent magnet 380 starts moving. Subsequently, the attractive magnetic force between the permanent magnet 380 and the yoke 376L holds the permanent magnet 380 in the second position.

Then, when the electromagnetic device 374 is energized so that the yokes 376L and 376R are magnetized into N and S poles, respectively, the resultant repellant magnetic force generated between the yoke 376L and the permanent magnet 380 biases the permanent magnet 380 toward the yoke 376R. The electromagnetic actuator 382 located under the permanent magnet 380 is then activated for displacing the permanent magnet 380 and the reflecting block 384 toward the yoke 376R until the permanent magnet 380 reaches adjacent to the yoke 376R, or the first position. It is to be noted that the electromagnetic device 374 is turned off immediately after the permanent magnet 380 starts moving.

Figure 33B:
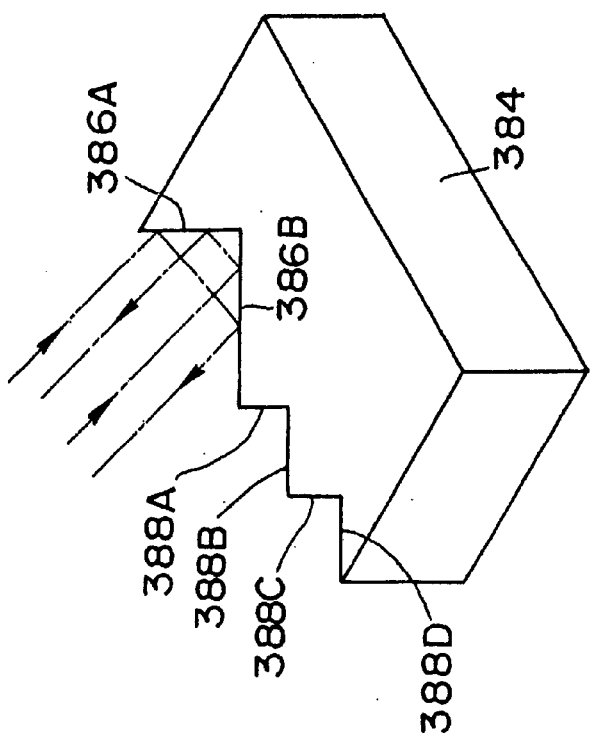
FIGS. 33A and 33B show light paths changed by displacing the reflecting block shown in FIG. 31 between the first and second positions.
Figure 33A:
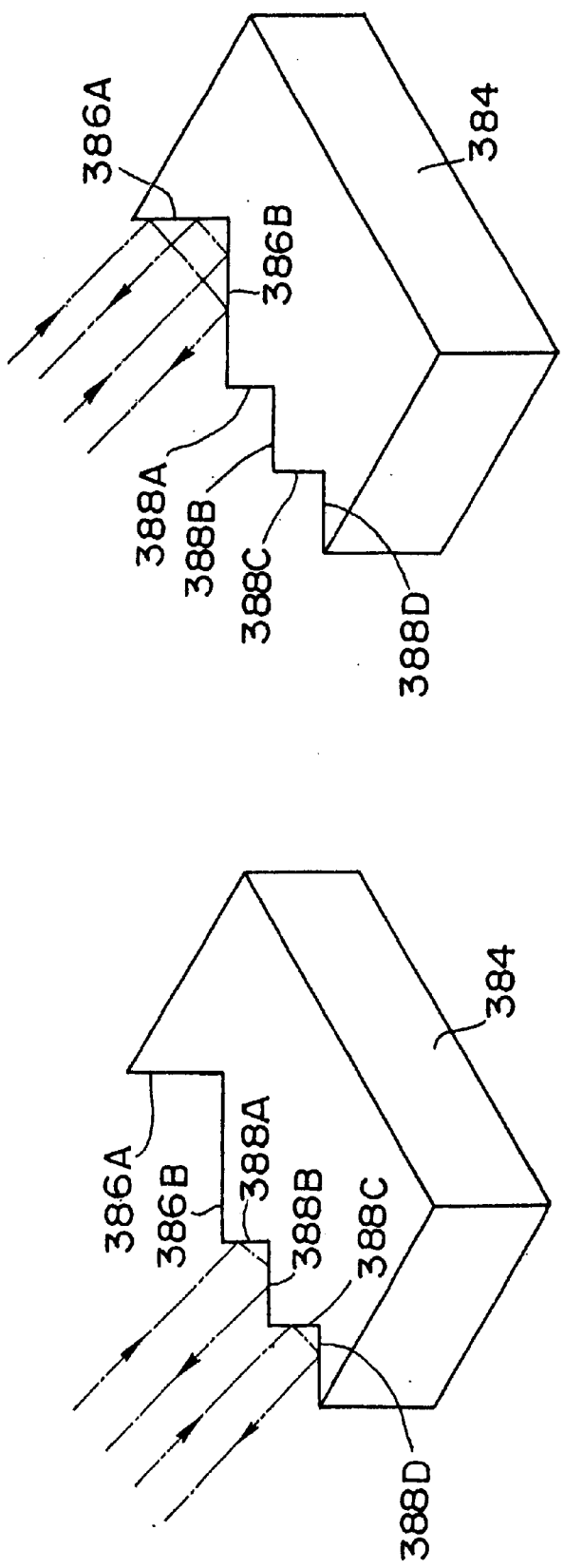

Accordingly, when the reflecting block 384 is in the second position shown in FIG. 33B, light emitted from optical fibers (not shown) toward large reflective surfaces 386A and 386B is directed to the opposite large reflective surfaces 386B and 386A where it is oriented to the opposite direction. On the other hand, when the reflecting block 384 is in the first position shown in FIG. 33A, light emitted from one optical fiber toward small reflective surfaces 388A and 388C is directed to the neighboring another small reflective surfaces 388B and 388D, respectively, where it is oriented to the opposite direction.

FIG. 34 shows another optical switching 301F, which includes a reflecting block 392 having two reflectors 394L and 394S arranged one on top the other. The upper reflector 394L is formed at its side wall with a L-shaped cutout having a pair of large reflective surfaces 396L that defines a right angle therebetween. The lower reflector 394S is formed at its side wall with a W-shaped cutout. The W-shaped cutout has four small reflective surfaces 396S running in a zigzag fashion so that each neighboring reflective surfaces 396S defines a right angle therebetween. It should be noted that each horizontal length of small reflective surfaces 396S is set to be one-half of the large reflective surfaces 396L. The two reflectors 394L and 394S are directed so that the reflective surface thereof confront to optical fibers 306A–306D leaving a certain gap therefrom and supported by an elevator not shown so that they can move ups and downs together.

With the optical switching device 301F, when the block 392 takes a first position where the reflector 394L faces the optical fibers 306A–306D, light emitted from the optical fiber 306A is reflected at one large reflective surface 396L and then the other large reflective surface 396L into the optical fiber 306D. Also, light emitted from the optical fiber 306C is reflected through the other large reflective surface 396L and then one large reflective surface 396L into the optical fiber 306B.

When the block 392 is moved upward into the second position where the reflecting plate 394S faces the optical fibers 306A–306D, light emitted from the optical fiber 306A is reflected at the first small reflective surface 396S and then the neighboring second small reflective surface 396S into the optical fiber 306B. Also, light emitted from the optical fiber 306C is reflected at the third small reflective surface 396S and then the neighboring fourth small reflective surface 3965 into the optical fiber 306D.

As can be seen from above, the block 384 or 392 allows the optical path to be changed quickly. Also, the reflective surfaces of the block 384 or 392 can correctly be directed to the required direction, which results in a precise optical path change.

The outer configuration of the blocks 384 and 392 can be modified in various ways except for the reflective surfaces. For example, one or more holes may be formed in each block to reduce its weight.

Although the blocks 384 and 392 are movably supported and the optical fibers 306A–306D and lenses 308A–308D are fixedly mounted in the previous embodiments, it is not restrictive to the present invention. That is, the blocks may be fixedly supported and the optical fibers and lenses may be movably supported, instead.

Figure 35:
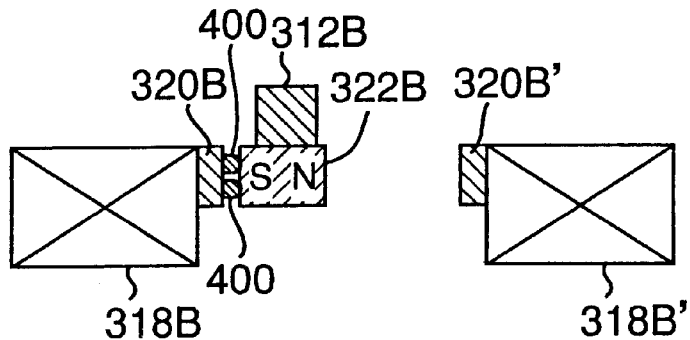
FIG. 35 is a cross sectional view of another optical switching device.
Figure 36:
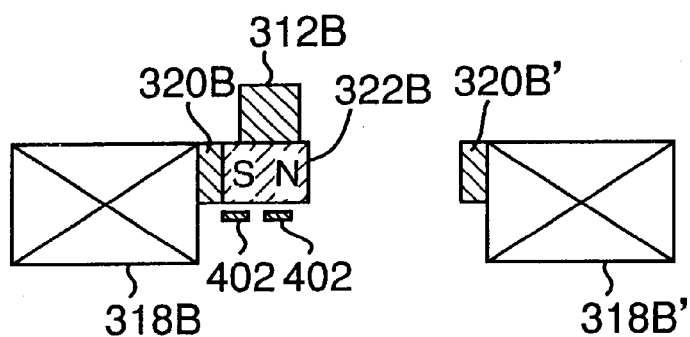
FIG. 36 is a cross sectional view of another optical switching device.
Figure 37:
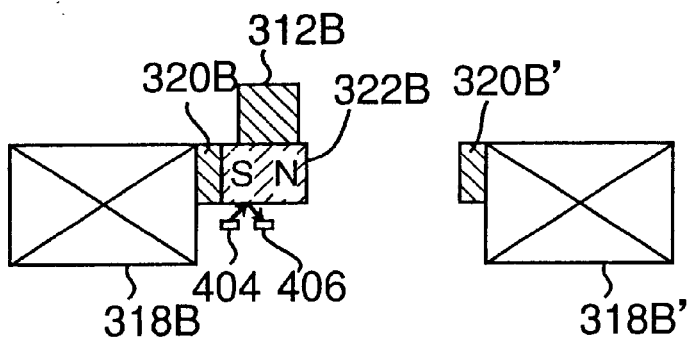
FIG. 37 is a cross sectional view of another optical switching device.

FIGS. 35–37 show mechanisms, each of which is designed to detect whether the permanent magnet 322B is in the first position. The detecting system in FIG. 35 has a pair of terminals 400, electrically insulated from each other. The terminals 400 are mounted on one side of the yoke 320, facing to the permanent magnet 322, which allows the terminals 400 to make a contact with a part of the permanent magnet 322 in the first position. The permanent magnet 322 has a conductive member at least on its surface confronting to the terminals 400 so that the terminals 400 are electrically connected when the permanent magnet 322 is in the first position. Further, the pair of terminals 400 are connected to a detecting circuit (not shown) which detects whether the terminals 400 are electrically connected with each other. This allows the detecting system to detect the permanent magnet 322 and the movable reflector 312 in the first position.

The detecting system shown in FIG. 36 has a pair of spaced electrodes 402 arranged adjacent to the permanent magnet 322 in the first position. The electrodes 402 are electrically insulated from each other and connected to a detecting circuit (not shown). The permanent magnet 322 has a conductive material at least one surface portion thereof confronting to the electrodes 402. In this arrangement, a capacitance between the electrodes 402 varies depending upon the position of the permanent magnet 322. More specifically, when the permanent magnet 322 is in the first position, the capacitance between the electrodes 402 is maximized. Accordingly, by detecting capacitance with the detecting circuit, it can be determined whether the permanent magnet 322 and the movable reflector 312 supported thereby are in the first position.

The detecting system shown in FIG. 37 has a light emitting element 404 and a light receiving element 406, both arranged adjacent to the permanent magnet 322 in the first position and connected to a detecting circuit (not shown). With this detecting system, when the permanent magnet 322 is in the first position, light emitted from the element 404 is reflected by the permanent magnet 322 and then received by the element 406. Accordingly, by the detection of an electric signal from the element 406, it can be determined whether the permanent magnet 322 and the movable reflector 312 supported thereby are in the first position.

It should be noted that such detecting systems may be provided close to the permanent magnet 322 in the second position. Alternatively, they may be mounted close to the permanent magnet 322 both in the first and second positions.

Figure 38:
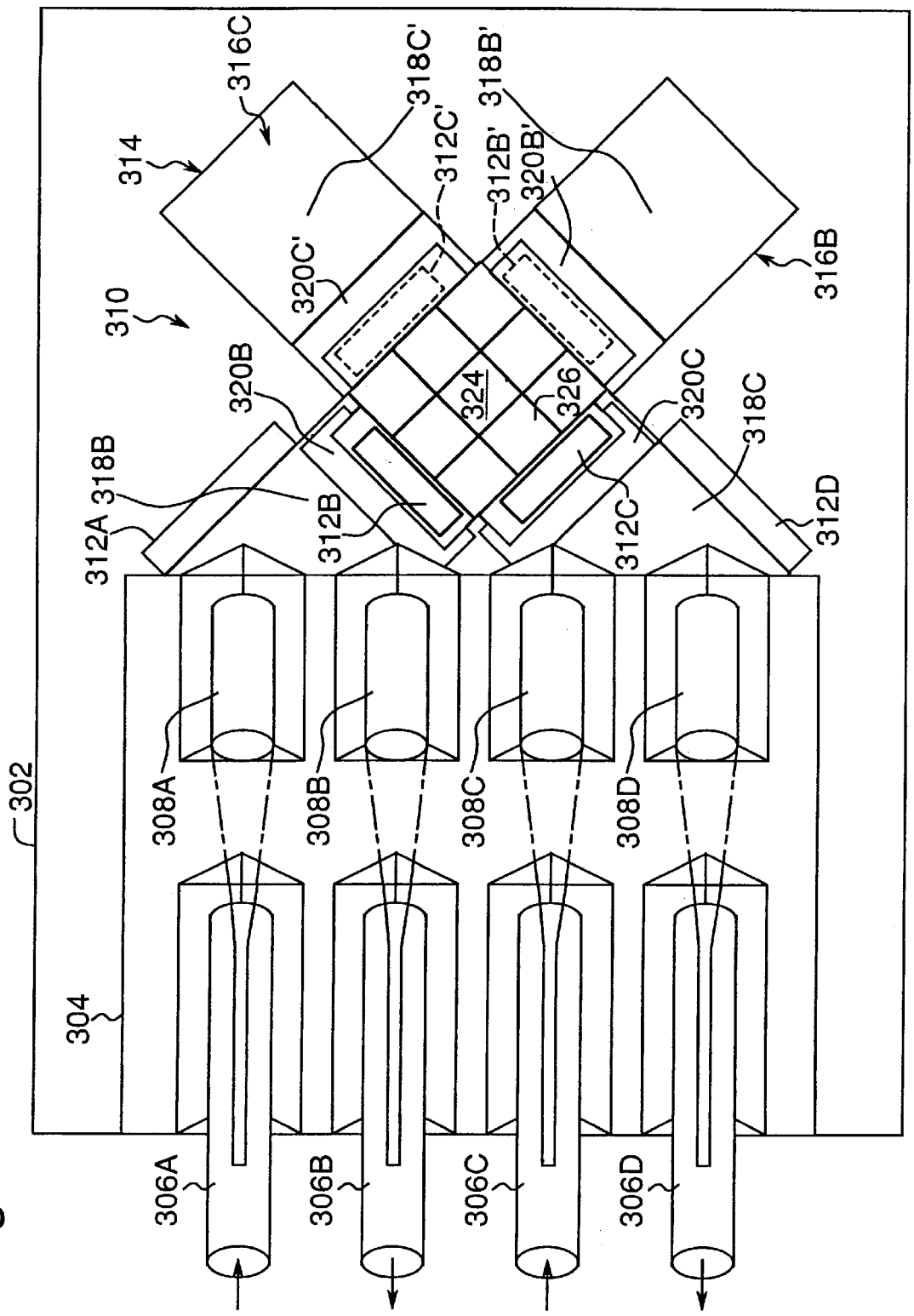
FIG. 38 is a plan view of another optical switching device of the present invention.

A variety of known optical fibers 306A–306D and lenses 308A–308D may be used for the optical switching device of the present invention. For example, as shown in FIG. 38, optical fibers 306A–306D with a tapered core shown in FIG. 15 may be used instead.

Figure 39:
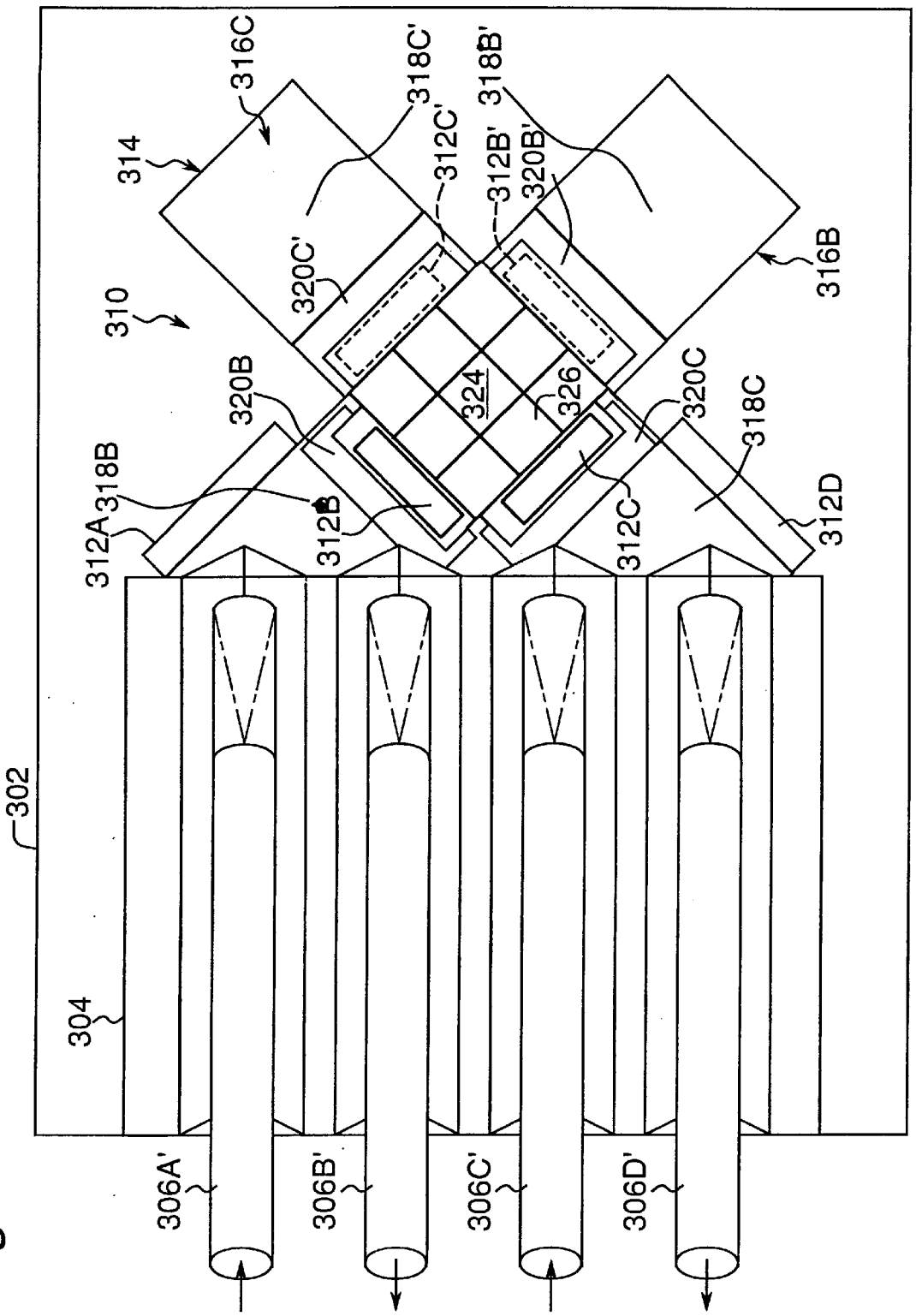
FIG. 39 is a plan view of another optical switching device of the present invention.

Referring to FIG. 39, an optical switching device includes optical fibers, each of which has a micro-collimator 306A'–306D' shown in FIG. 16.

Figure 40:
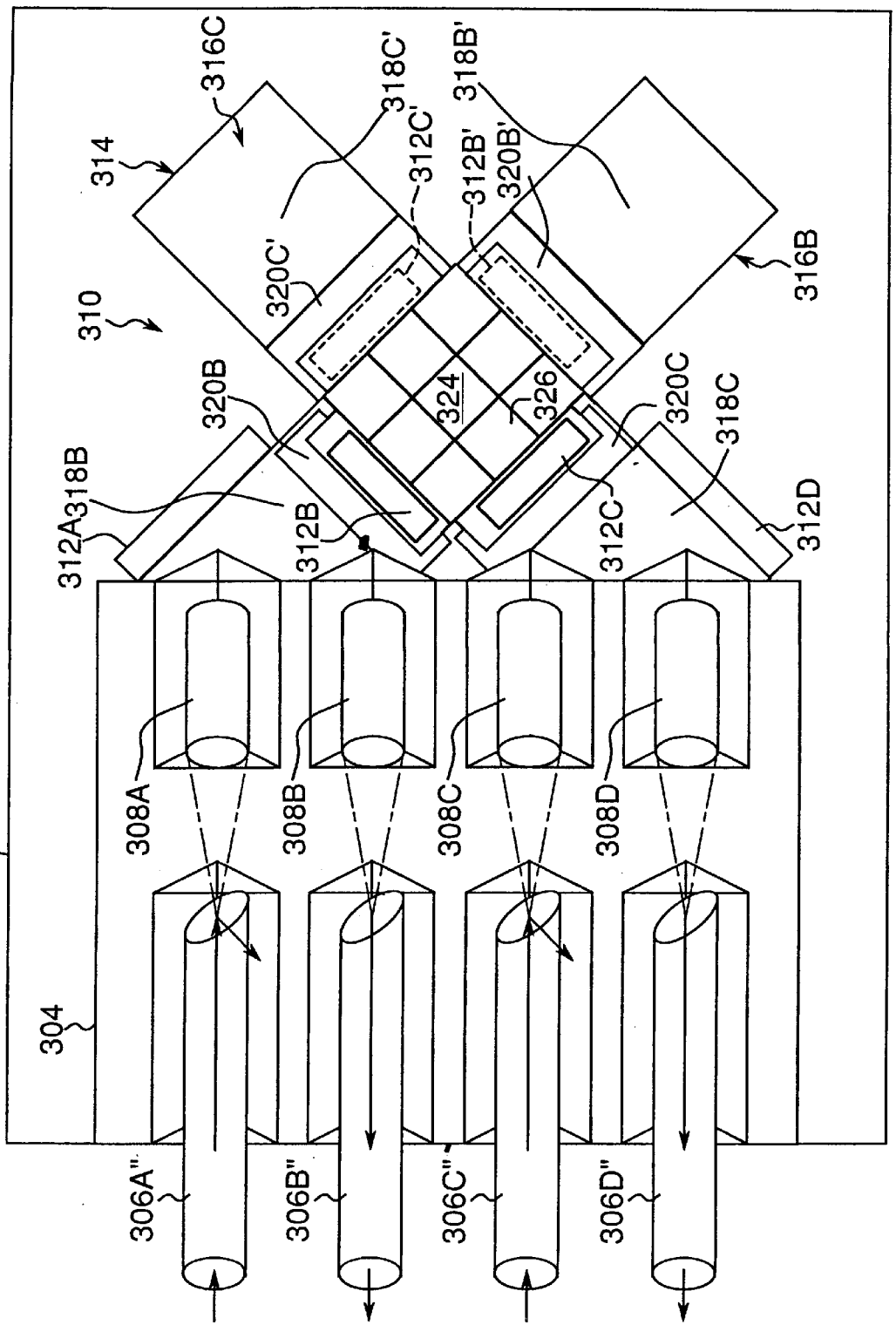
FIG. 40 is a plan view of another optical switching device of the present invention.

Referring to FIG. 40, an optical switching device of this embodiment includes optical fibers 306A"–306D" with an end face angled to the longitudinal axis thereof shown in FIG. 17.

Figure 41:
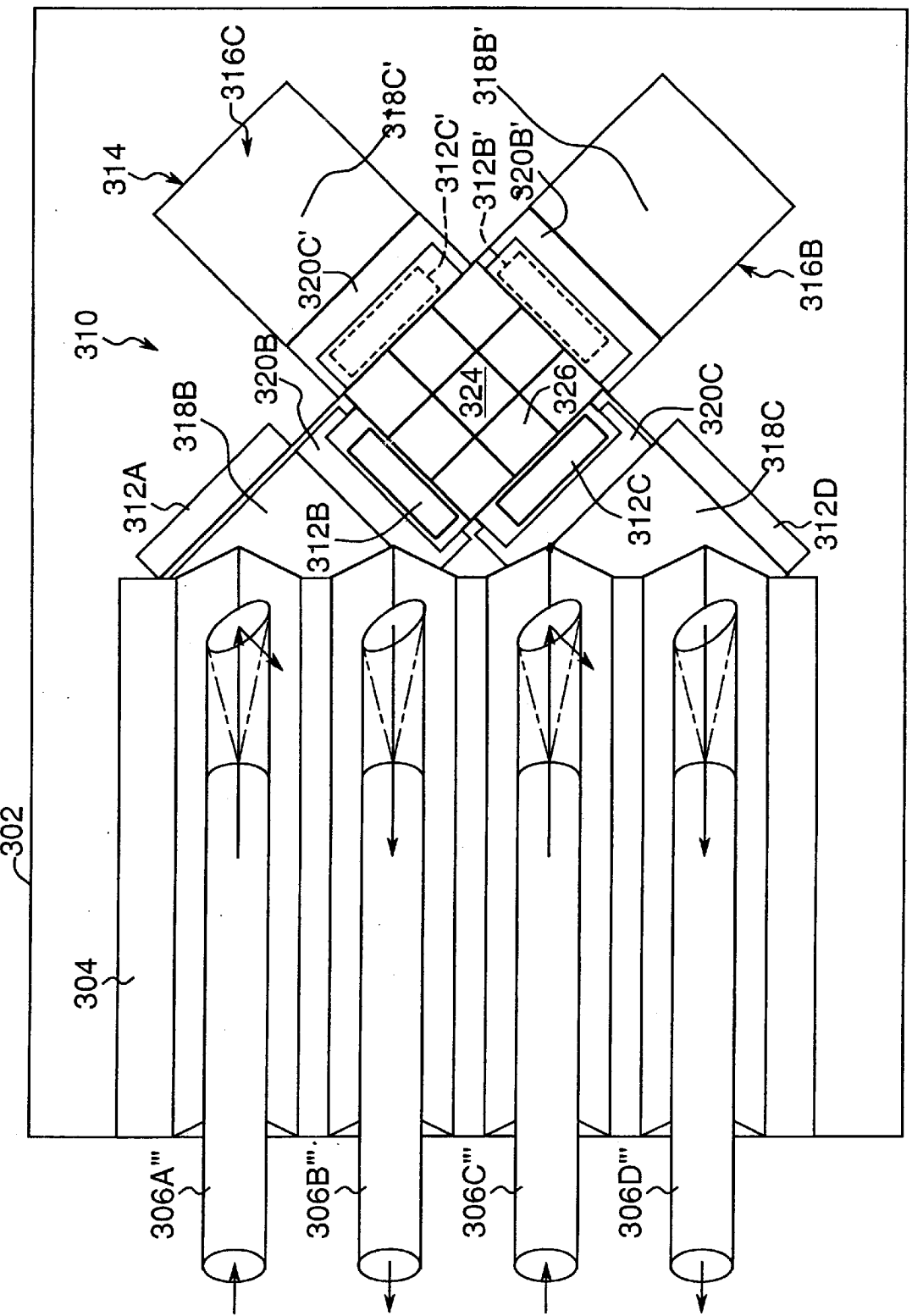
FIG. 41 is a plan view of another optical switching device of the present invention; and, FIG. 42 is a perspective view of another prior art switching device.
Figure 42:
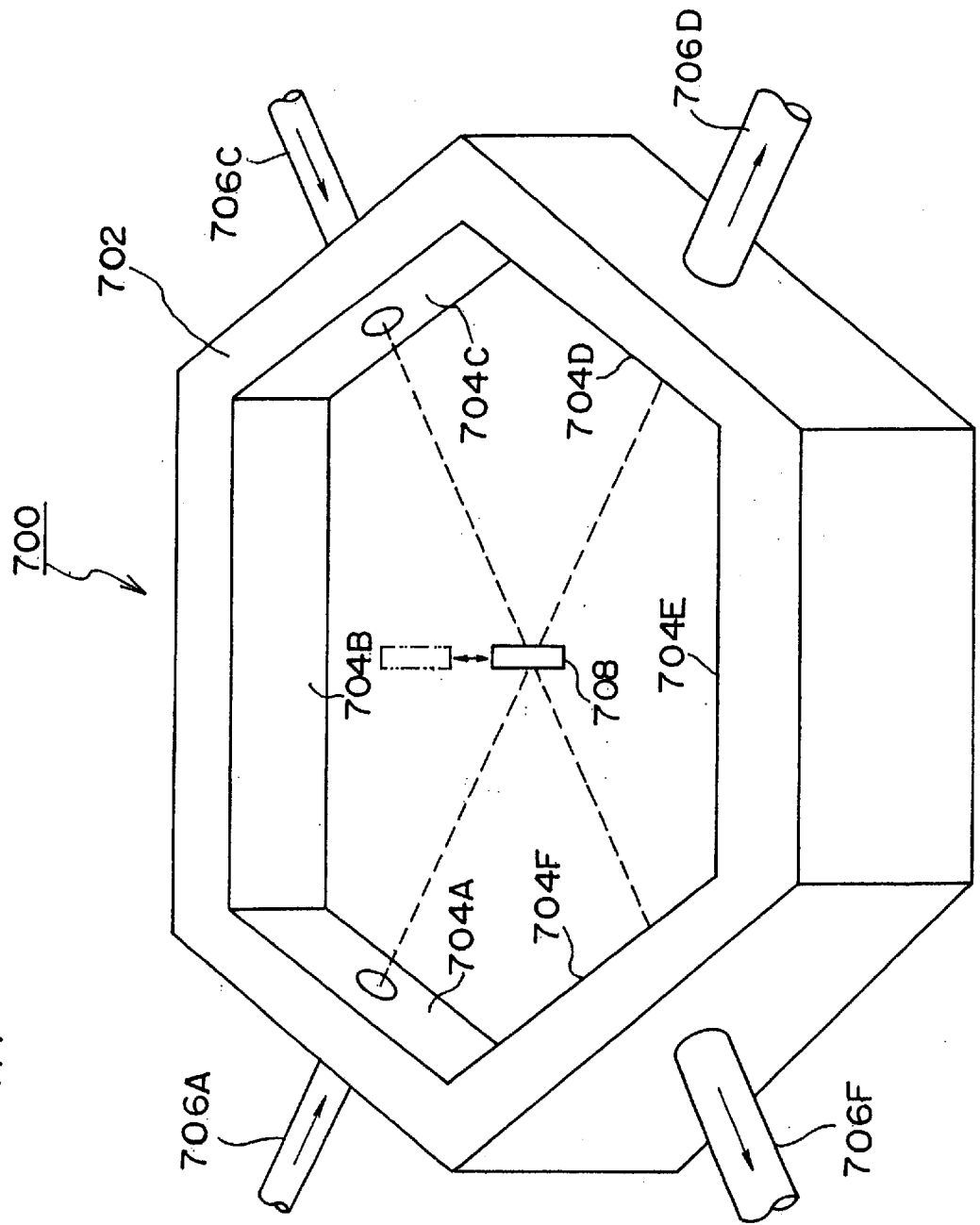

Referring to FIG. 41, an optical switching device of this embodiment includes optical fibers 306A'"–306D'" shown in FIG. 18, each of which end being angled to the longitudinal axis thereof.

There have been described in detail for certain preferred embodiments thereof, but it will be understood that various modifications and improvements can be effected within the spirit and scope of the invention.

For example, although the electromagnetic linear actuator is used for displacing the movable reflectors in the previous embodiments, it may be replaced by another actuator such as piezoelectric actuator.

Also, although reflective plates are used for changing the optical paths in the previous embodiments, a prism may be used instead.

Further, although the optical fiber is used for conducting light, it may be replaced by another light guide member such as waveguide tube.

Furthermore, although each reflector is inclined at 45 degrees to the optical fibers in the previous embodiments, the angle is not restrictive to the present invention provided that light can be transmitted from the input to output fibers.

Moreover, although the cylindrical lens 306 is used for converging light in the previous embodiments, it may be replaced by another lens, such as ball lens, capable attaining the same function.

Also, although the lens is positioned between the input light path and the reflective member, it is not necessary as long as light can be properly transmitted from the input to output optical members.

In view of above, according to the present invention, the optical-path switching element can properly be retained in position by the magnetic force without consuming any power.

Also, optical loss can be decreased and thereby increasing a light transmitting effect by the combination of suitable optical fibers and lens.

Further, the position of the optical-path switching element can be detected electrically, which results in a highly reliable optical switching device.

Furthermore, the non-contact type detector for detecting the position of the optical-path switching element prevents the detector from being unmovable, which increases a reliability of optical switching device for a long time.

Moreover, the combination of the optical fiber and lens (e.g., collimated lens) reduces light loss at input and output ends of the optical fibers, which allows light to be properly transmitted from the input to output optical members.

In particular, with the optical switching device of the second invention, since the input and output light paths can be arranged on one side thereof, which decreases a mounting space thereof. This in turn results in a compact optical switching device.

Also, the use of reflector, such as block, having reflecting surfaces oriented to certain directions allows the optical path to be changed quickly.

What is claimed is:

1. An optical switch for transmitting light from a light emitter to a selected one of plural light receivers, comprising:
    a reflector changing a path of light emitted from a light emitter;
    a first permanent magnet holding said reflector, said first permanent magnet having first and second magnetic poles having opposite polarities;
    a supporting member supporting said reflector and said first permanent magnet so that said reflector and said first permanent magnet can move between a first position in which the emitted light travels into one of a plurality of light receivers and a second position in which the emitted light travels into another of said plurality of light receivers; and
    magnetic means for selectively generating first and second magnetic fields, causing said reflector and said first permanent magnet to move to the first and second positions, respectively.

2. The switch according to claim 1 further including holding means for holding said reflector in said first and second positions.

3. The switch according to claim 2, wherein said holding means further includes a second permanent magnet mounted on said reflector;
    a first electromagnet positioned adjacent to said reflector when said reflector is in the first position, said first electromagnet having a first iron core;
    a second electromagnet positioned adjacent to said reflector when said reflector is in the second position, said second electromagnet having a second iron core; and
    a control circuit for controlling said first and second electromagnets so that, when said reflector is in the first position, said control circuit energizes said first electromagnet for a certain period of time to cause an attraction force between said first iron core and said second permanent magnet and thereby hold said reflector in the first position, and, when said reflector is in the second position, said control circuit energizes said second electromagnet for a certain period of time to cause an attraction force between said second iron core and said second permanent magnet and thereby hold said reflector in the second position.

4. The switch according to claim 1 including a detector for detecting whether said reflector is in the first position or the second position.

5. The switch according to claim 4, wherein said detector includes
    an electrically conductive member mounted on said reflector;
    first and second terminals, said first and second terminals being positioned so that said first and second terminals are electrically separated from each other and make contact with said conductive member of said reflector when said reflector is in one of the first and second positions; and
    a detecting circuit for detecting whether said first and second terminals are electrically connected through said conductive member.

6. The switch according to claim 4, wherein said detector includes
    an electrically conductive member mounted on said reflector;
    first and second electrodes, said first and second electrodes being positioned so that said first and second electrodes are electrically separated from each other and adjacent to said conductive member of said reflector when said reflector is in one of the first and second positions; and
    a detecting circuit for detecting a variation of capacitance between said first and second electrodes.

7. The switch according to claim 4, wherein said detector includes
    a photo-coupler positioned adjacent to said reflector when said reflector is in one of the first and second positions; and
    a detecting circuit for detecting an output signal transmitted from said photo-coupler.

8. The apparatus according to claim 1, wherein each of said light emitter and at least one of said light receivers includes an optical fiber, a lens arranged on a longitudinal axis of said optical fiber, and a holder for holding said optical fiber and said lens.

9. The switch according to claim 8, wherein said lens associated with said light emitter collimates the light.

10. The switch according to claim 8, wherein said lens associated with said light receivers converges the light.

11. The switch according to claim 8, wherein said optical fiber is a tapered optical fiber which includes a core extending along the longitudinal axis and increasing in diameter toward an end adjacent to said lens.

12. The switch according to claim 8, wherein said optical fiber has an end surface, said end surface being oblique to the longitudinal axis so the light is reflected from the core of said optical fiber.

13. The switch according to claim 1, wherein each of said light emitter and at least one of said light receivers includes a collimator and an optical fiber which includes a cylindrical lens optically connected to said optical fiber.

14. An optical switching apparatus comprising:
   (a) first and second optical inlets and first and second optical outlets, arranged in parallel;
   (b) reflecting means having four reflectors, said reflectors being spaced apart from first ends of said first and second optical inlets and outlets; and
   (c) a switch for moving said reflecting means between a first arrangement where said reflecting means reflects light from said first and second inlets into said first and second outlets, respectively, and a second arrangement where said reflecting means reflects light from said first and second inlets into said second and first outlets, respectively.

15. The apparatus according to claim 14, wherein said four reflectors comprise two fixed reflectors and two movable reflectors, said two movable reflectors taking a first position in the first arrangement and taking a second position in the second arrangement.

16. The switch according to claim 15, wherein said switch further includes two movable members for supporting said two movable reflectors, respectively, and a moving mechanism for moving said two movable members between the first and second positions.

17. An optical switching apparatus comprising:
   (a) four optical paths, including first and second optical inlets and first and second optical outlets, arranged in parallel;
   (b) a movable member spaced apart from first ends of said first and second optical inlets and outlets, said movable member including two neighboring large reflective surfaces and four neighboring small reflective surfaces, said two neighboring large reflecting surfaces being arranged in an L form defining a right angle therebetween, said four small reflective surfaces being arranged in a zigzag fashion defining a right angle therebetween; and
   (c) a mechanism which moves said movable member between a first state where light from said first and second optical inlets is reflected by said large reflective surfaces into said first and second optical outlets and a second state where light from said first and second optical inlets is reflected by said small reflective surfaces into said first and second optical outlets.

* * * * *